(12) United States Patent
Quinn

(10) Patent No.: US 9,457,962 B1
(45) Date of Patent: Oct. 4, 2016

(54) PALLET/FLIP UNIT/GANTRY SYSTEM

(71) Applicant: Robert Richard Quinn, Washington Township, MI (US)

(72) Inventor: Robert Richard Quinn, Washington Township, MI (US)

( * ) Notice: Subject to any disclaimer, the term of this patent is extended or adjusted under 35 U.S.C. 154(b) by 0 days.

(21) Appl. No.: 13/999,338

(22) Filed: Feb. 12, 2014

Related U.S. Application Data

(62) Division of application No. 12/653,332, filed on Dec. 11, 2009, now Pat. No. 8,651,918.

(60) Provisional application No. 61/201,689, filed on Dec. 12, 2008.

(51) Int. Cl.
  *B24B 49/00* (2012.01)
  *B24B 41/06* (2012.01)
  *B65G 47/248* (2006.01)

(52) U.S. Cl.
  CPC .................................. *B65G 47/248* (2013.01)

(58) Field of Classification Search
  CPC ... B65G 47/248; B65G 47/24; B65G 47/252
  See application file for complete search history.

(56) References Cited

U.S. PATENT DOCUMENTS

| | | | | |
|---|---|---|---|---|
| 4,232,777 A | * | 11/1980 | Smith et al. | 198/404 |
| 5,158,424 A | * | 10/1992 | Mojden et al. | 414/799 |
| 5,593,040 A | | 1/1997 | Shelton et al. | |
| 5,820,013 A | | 10/1998 | Ortiz | |
| 6,139,243 A | * | 10/2000 | Jackson et al. | 414/405 |
| 6,371,274 B1 | | 4/2002 | Ditter et al. | |
| 6,651,817 B2 | | 11/2003 | Shim et al. | |
| 6,714,714 B1 | | 3/2004 | Dee | |
| 7,395,933 B2 | | 7/2008 | Ruth | |
| 7,708,325 B2 | * | 5/2010 | Grant | 294/81.4 |
| 2005/0102940 A1 | * | 5/2005 | Tyler | 52/455 |
| 2005/0281662 A1 | * | 12/2005 | Carey | B65G 13/12 414/765 |

* cited by examiner

*Primary Examiner* — Dung Van Nguyen
(74) *Attorney, Agent, or Firm* — Christopher John Rudy

(57) ABSTRACT

Industrial pallet has a body with an open bay, in which a work piece can be secured such that it can be worked on from either side of the pallet. An overhead gantry and/or flipping unit may be employed to move from station to station and/or flip the work piece itself or the work piece mounted in the pallet. Aside from the flipping unit, robotic moving and/or loading may be employed by the overhead gantry, which has two axes of motion only. Such components can be combined in a manufacturing system to make parts.

24 Claims, 23 Drawing Sheets

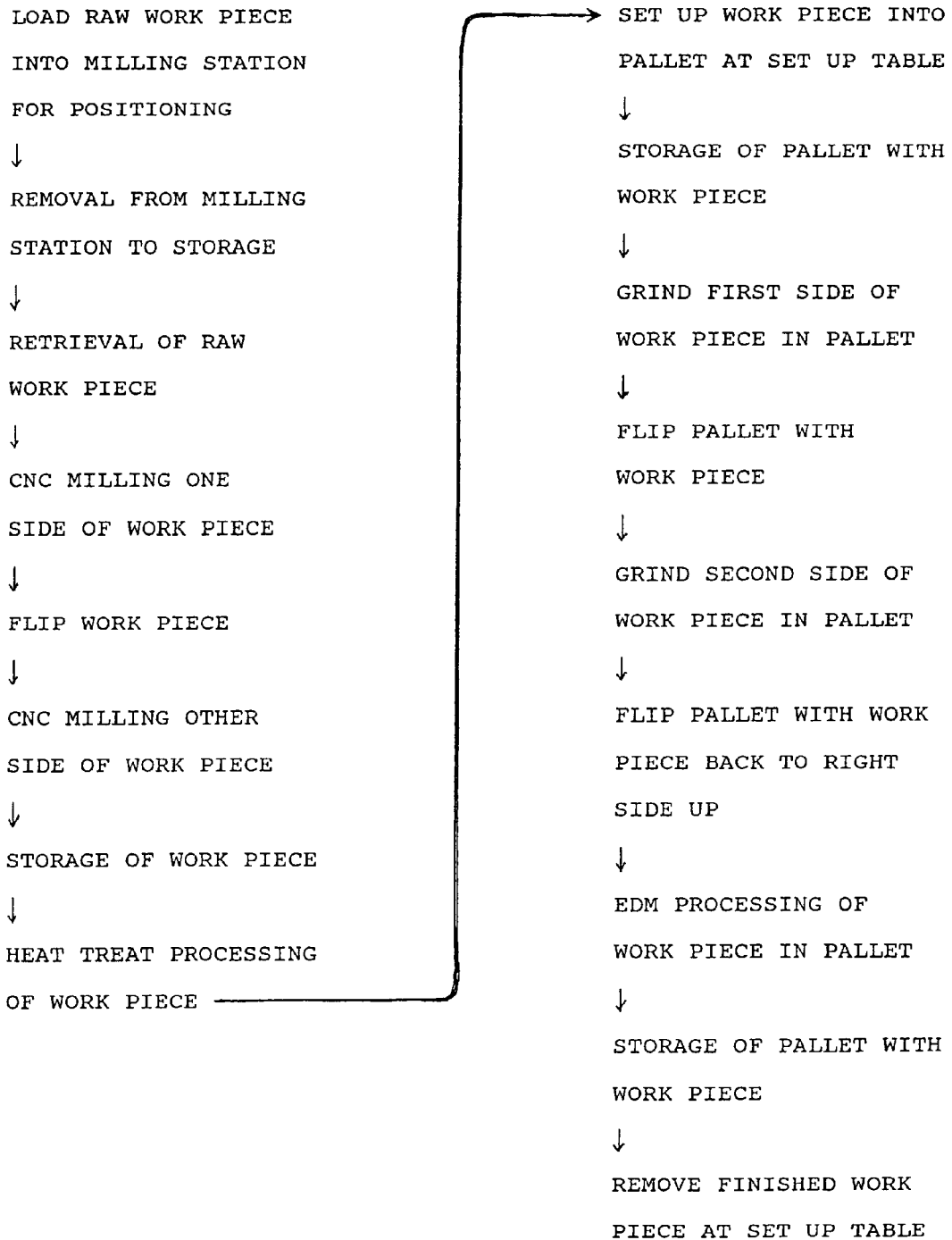

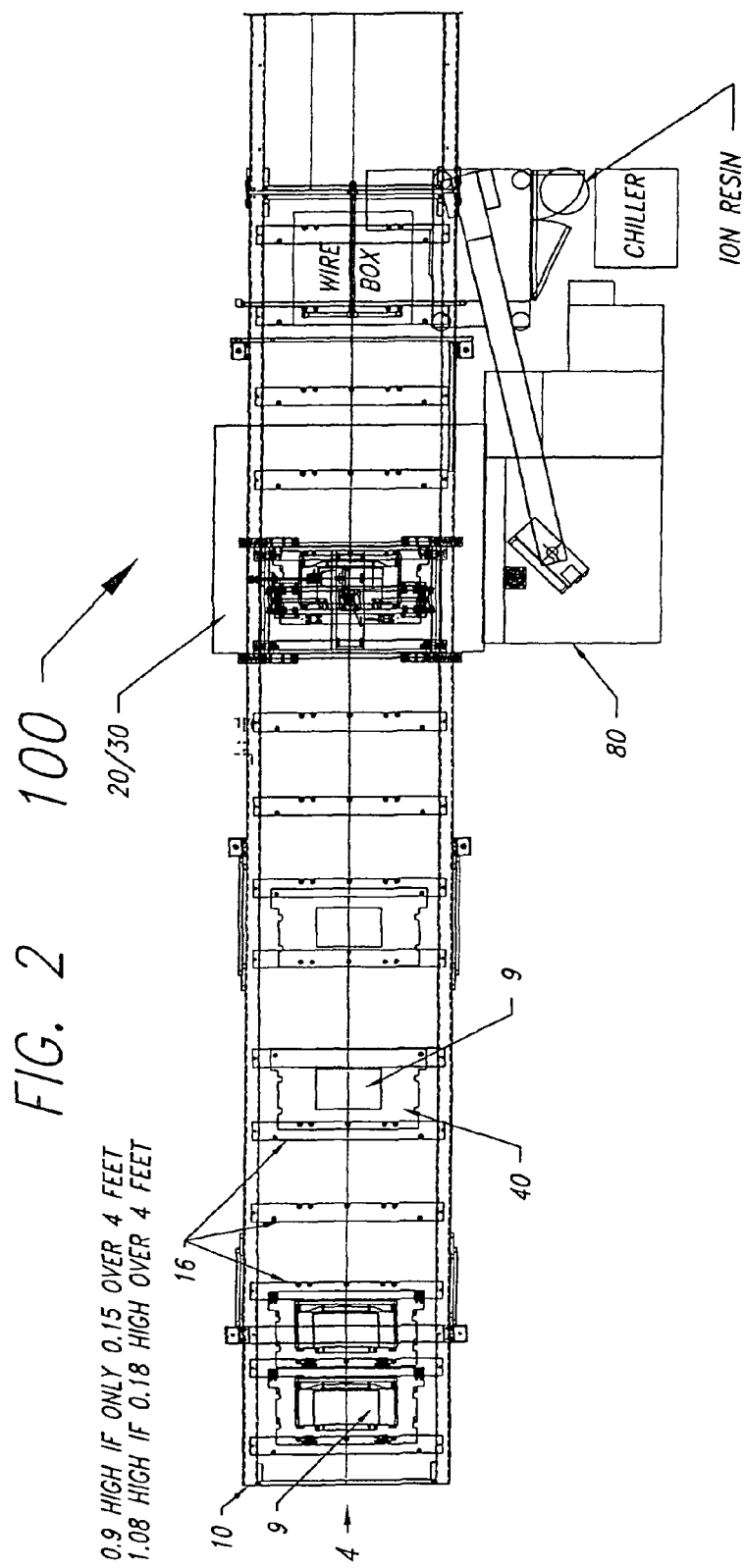

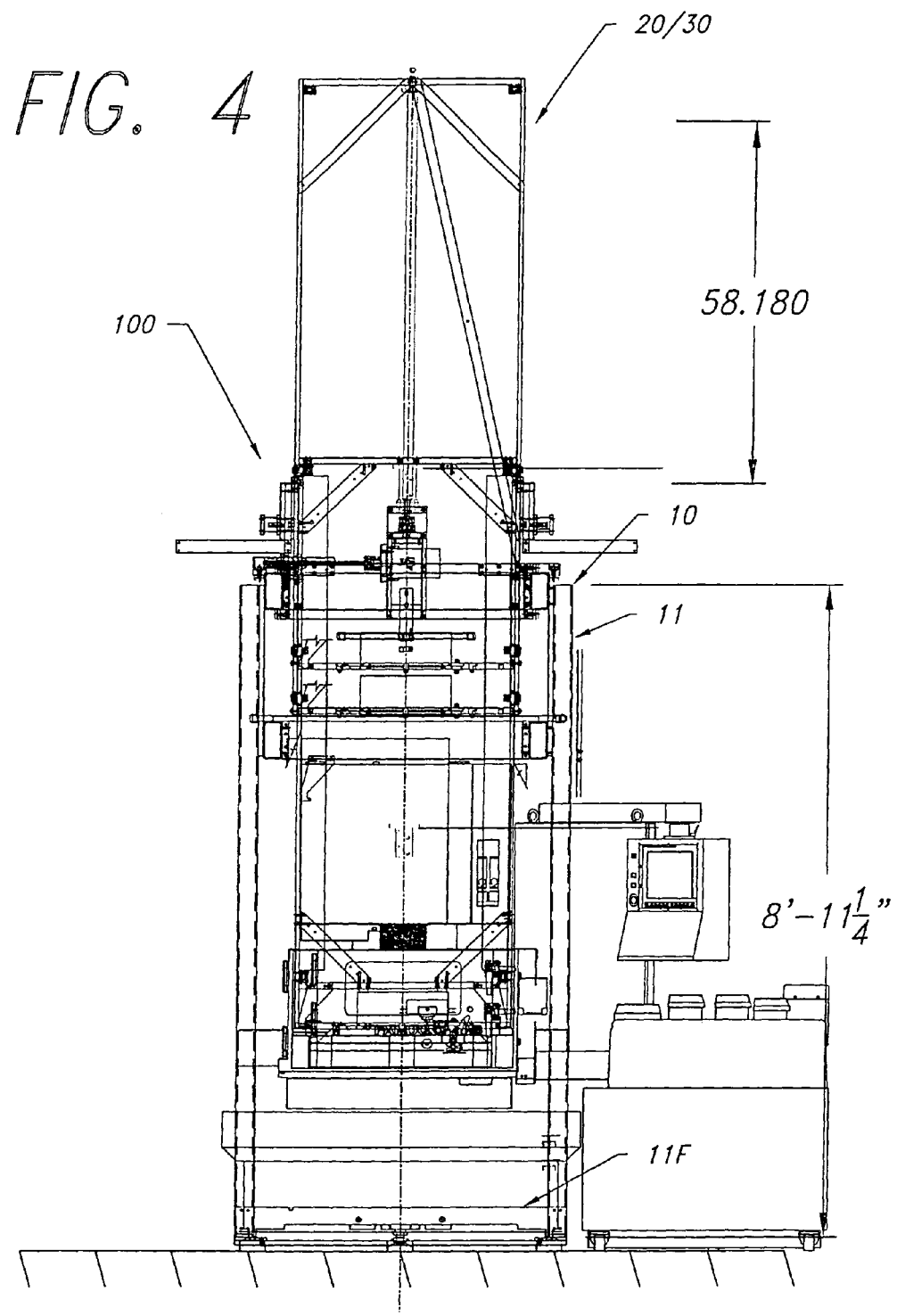

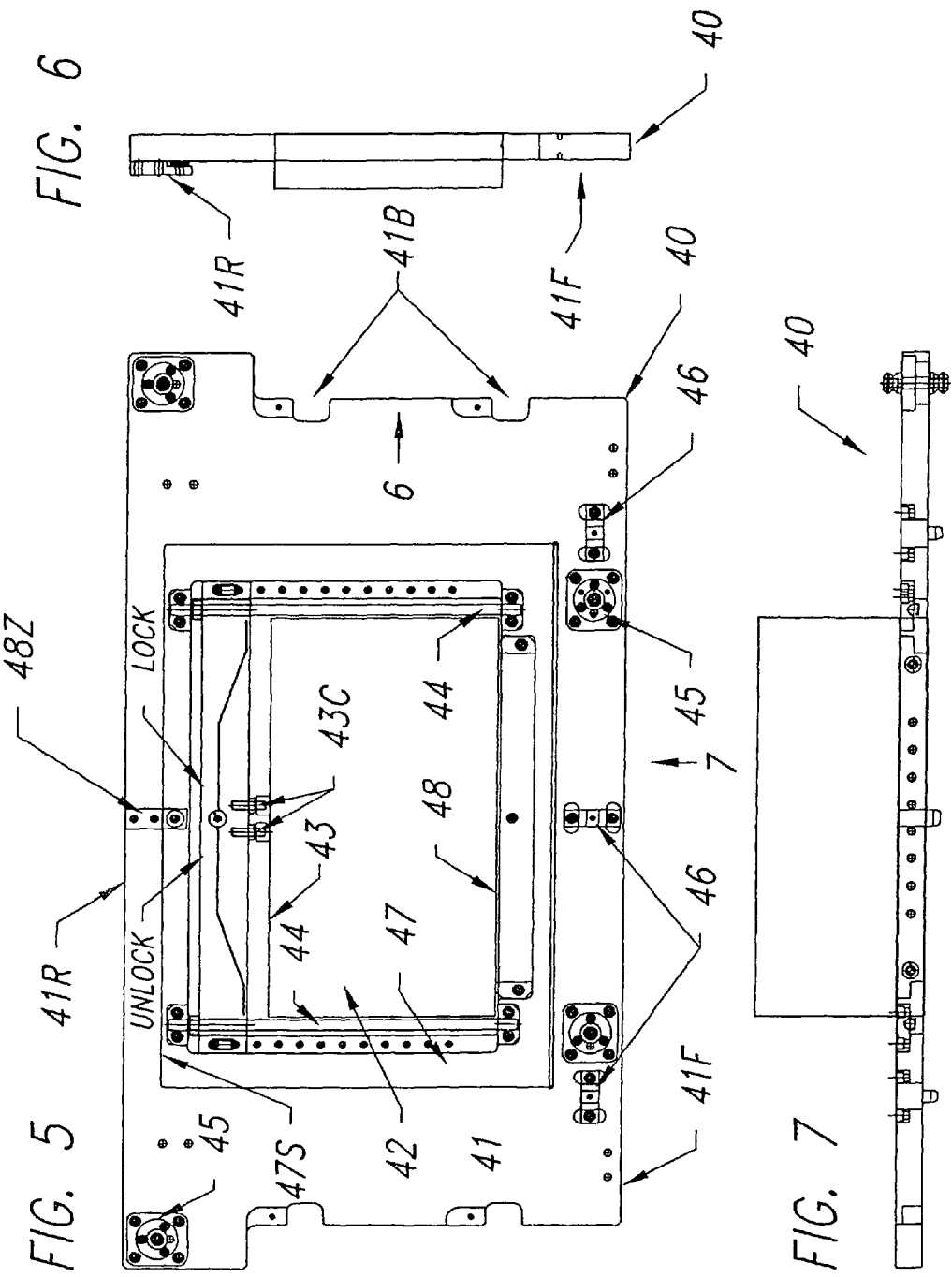

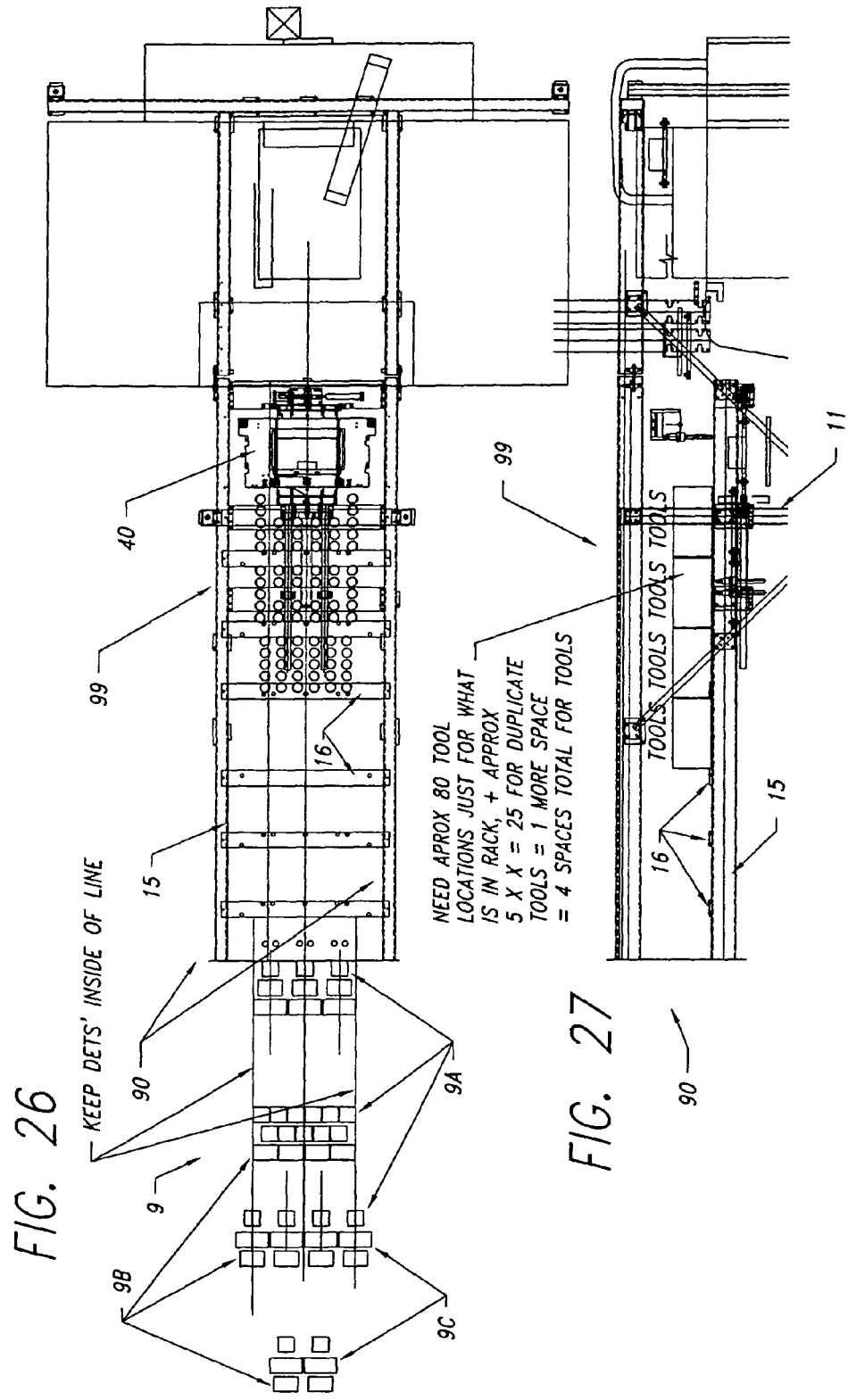

PALLET/FLIP UNIT/GANTRY SYSTEM

This is a divisional under 35 USC 120/121 of U.S. application Ser. No. 12/653,332 filed on Dec. 11, 2009 A.D., now U.S. Pat. No. 8,651,918 B1, which, as does the present application, claims benefits under 35 USC 119(e) of U.S. provisional patent application No. 61/201,689 filed on Dec. 12, 2008 A.D. The specifications of those applications in their entireties, to include their drawings of course, are incorporated herein by reference.

FIELD AND PURVIEW OF THE INVENTION

This concerns an open bay pallet, flip unit and/or overhead gantry system. The same may be employed in various production methods or processes such as with milling, grinding, electric discharge machining (EDM) processing, and other machining of a work piece to make a part. The part, for example, may be a steel detail for a progressive die.

BACKGROUND TO THE INVENTION

Manufacture of parts through machine cutting, milling, grinding and/or EDM processing is widely employed in industry. Aside from the very expensive and fairly rare proposition of milling a part in a tombstone pallet, often a part is milled, drilled and ground outside the confines of a pallet. A pallet, however, is typically employed to hold the part for EDM processing. Commercially available pallets for EDM processing typically have receiver units that mount to the top surface of mounting rails on a work piece within the wire EDM machine. A drawback is that EDM, for example, which is an efficient process otherwise, is limited to smaller plate work without removal and subsequent re-installation of the work piece as well as re-calibration of the receiver unit, and the work piece set up for EDM requires a very high degree of precision. This increases the possibility of error as well as the time required in manufacturing the part. A typical manufacturing process for making steel details for progressive stamping dies, in which usually no two details are alike, may generally entail manually setting up a work piece in a computer numerical control (CNC) machining center; performing the machining operation such as milling, drilling, boring, counterboring, and so forth; sending the work piece to a heat treating facility off premises for heat treating; performing multiple separate set up operations for readying the work piece for grinding, each set up for one side of the work piece, which is highly time consuming; subjecting the work piece to grinding, one side per time; set up for EDM, which is generally the most time consuming of steps; and subjecting the work piece in a pallet to EDM processing. Manual movement of the work piece is usually carried out between grinding and EDM processing. Known robots that do this type of work offer some level of automation, which improves upon the manual operations otherwise needed. However that may be, known overall systems are typically floor mounted, which prevents workers from access to much if not most of the machine tool space, which sits on the floor, while running; thus, in other words, the workers get "caged in" in the entry area to any robotics system. In addition, these robotic systems often prevent access to most of the machine tools while in operation. Also, the floor-mounted nature of the known systems limits the number of machine tools that can be tied together, and are not easily expandable, if at all. The robots that service the known systems generally have a high number of axes of motion, and yet the end result of their motions are often limited, especially since they service only one or two machine centers, which is not cost effective.

It would be desirable to ameliorate problem(s) in the art, and desirable to improve manufacturing efficiency. And, it would be desirable to provide an alternative to the art.

A FULL DISCLOSURE OF THE INVENTION

Provided hereby is an industrial pallet comprising a body with an open bay, in which a work piece can be secured such that it can be worked on from either side of the pallet. An overhead gantry and/or flipping unit may be employed to move from station to station and/or flip the work piece itself or the work piece mounted in the pallet. Aside from the flipping unit, robotic moving and/or loading may be employed by the overhead gantry, which has two axes of motion only. Such components can be combined in a manufacturing system.

The invention is useful in manufacture of parts.

Significantly, by the invention, the art is improved in kind. A viable and efficient alternative is provided. The open bay pallet provides for substantially increased versatility and greater capacity in manufacturing capability; parts, including the steel details for progressive stamping dies, can be worked from above and below the pallet, and thus do not need to be moved, repositioned, and recalibrated as with known pallets; grinding and EDM processing can be carried out with one setting of the work piece in the open bay pallet; and many other features not possible to be manufactured in a part heretofore can be provided hereby. The open bay pallets can have the capability to be locked down, in other words, precision loaded and clamped, into the predetermined machine tool such as a grinder, and EDM processor, and so forth, or set up station receiver, and maintain access from the two most important sides, top and bottom. This dual sided access of the open bay pallet allows automatic grinding on both of these sides of the work piece. The lock down system can integrate with an EDM processing machine in a sub-level style, which does not interfere with normal operation of the machine, and the sub-level locking/locating system maintains flexibility of the EDM processing machine and minimizes set up operations and time. This provides for operation of the EDM processing machine in its standard fashion without the open bay pallet, or with the open bay pallet, with little or no change over time associated with the switch on account of the sub-level table surface locking system. Thus, since both sides of the work piece can be ground in the open bay pallet, and that same pallet can be moved to the EDM processing machine, the overall process for that can be reduced from three set up operations, i.e., one for each side of the work piece at the grinder and one at the EDM processing machine, to a single set up operation. This further means that the single set up operation hereby does not require the accuracy otherwise required at EDM set up; it only requires locking the work piece into the locating mechanism in the open bay pallet. This more simple approach requires less skill on the part of the operator, is easier to teach to him, and takes less time than either of the prior art set up operations. Also, employment of this approach allows simple verification that the EDM process is set up properly, which ensures a higher level of quality control and reliability in the EDM process. Since the work pieces can be ground in place in the open bay pallet, even including flipping with the flipping unit, there generally is no need for adjustment of the work piece before being taken to the EDM processing station, which ensures a more consistently accurate set up of the work piece than in the manual method of setting up for the EDM processing, which is done after grinding. The open bay pallet can take advantage of special notches and locating features such as located on front and back edges of the pallet, as well as corresponding notches in the work piece, which are automatically milled into the work piece at the milling stage of the manufacturing process, typically before grinding or EDM processing. The automation of this process ameliorates if not substantially eliminates most if not all the possibility of error in work piece set up operations, and also makes the amount of time required to mill the locating features minimal. The milling automation is provided by an integrated design system. Such locating features milled into the open bay pallet and the work piece are also used in the work piece in the automated milling process, which allows the present system to provide for automatically flipping the work piece over itself or when mounted in the open bay pallet, which heretofore was not known or feasible. These locating features milled into the work piece also enable storage of the work piece after CNC milling and flipping, and its retrieval in an accurate and precise manner. Because these machined work pieces are not in pallets, with the open bay pallets typically coming into play for the grinding and EDM processing operations, many more work pieces can be stored with the practice of the present system than in a prior art tombstone system because storage of a milled, drilled, and so forth machined work piece in the present system is done without any pallet before grinding or EDM processing, which contributes further to reduced costs and increased capacity of the system. The open bay pallets can be employed with work pieces that do not have the quick locating features milled into them; thus, the versatility of the system is increased. The open bay pallets have the capacity to be adjustable with respect to pitch of the clamp bar mechanism for leveling of its mounting member, for when no milled locating feature is provided in the work piece, or fixed or locked with respect to pitch, say, at the same level as the clamp bar housing of the pallet, for when the work piece is taken through grinding and EDM processing, normally including the milled feature having work piece, depending on which mode of operation for which they are being used. For instance, if the work piece needs to be ground and subject to EDM processing, i.e., it is a new work piece, then the fixed or locked version will be normally employed. On the other hand, if the work piece is, for example, a detail that has already been processed through grinding and/or EDM processing steps and after removing from the system it is desired to be subject another time to EDM processing such as to make changes to the work piece such as a design change, a necessary adjustment to a dimension, and so forth, then the open bay pallet can be used in adjustable mode in order to "level" the already ground part to the EDM processing machine. The present system can include automatic flipping of the open bay pallet or the milled work piece with locating notches by a 180-degree rotation by use of the flipping unit, which may be on the gantry, which allows the noted access to the work piece from either side, top or bottom, for purposes of grinding. Also, grinding of work piece such as a steel detail secured in the open bay pallet avoids effects normally associated with grinding on a magnet, in which case the vertical magnetic force can be so strong as to act on the work piece and deform it so that the finished work piece may not be as truly accurate or precise in final dimensions as desired. The present system can include a wash down station to rinse off grinding fluid such as between grinding and EDM processing. An air blow off station located any suitable place in the system, say, near the grinding station, can eliminate water pooling on the open bay pallets and work pieces while they are in storage. A probe built into the present system, located, for instance, with a grinding machine housing spindle column, can be provided so that the automatic grinding provides for a more precise part in that the ground dimensions are measured with the probe and adjustments are automatically made to ensure that the parts are completed accurately and with a very high level of tolerance with no direct human intervention. The present system can be employed also to load parts into a CNC milling machine and automatically run work pieces. Because the present system can be run in this fashion, it avoids the need to purchase and operate an expensive pallet pool style machining center, which can cost three to four times as much as that of a stand alone machining center. The present system is also capable of delivering a multitude of tools to the CNC machining center, and due to a unique tool storage and retrieval subsystem, which operates similar to the work piece storage system, the number of tools that may be stored is greater than in most commercially available systems, which makes for efficient overnight machining of a wide mix of work pieces with the present system. A pallet could be modified with tool receiving stations to receive the tools and have them stored there. A computer queue subsystem can control the robot as well as the milling machine, the grinding machine, the EDM processing machine, plus the storage, and downloading of CNC programs to those machines. Computer controlled automation thus can be nearly all-encompassing in manufacturing with the present system. The overhead gantry storage is highly space efficient. The system can enable unattended around the clock operation of milling, grinding and EDM machines. Because it is so highly space efficient, it becomes feasible for one robotic system to service more machine tools within the one system. The system can use only two axes of movement only, which reduces cost and complexity, and increases reliability.

Numerous further advantages attend the invention.

The drawings form part of the specification hereof. With respect to the drawings, which are not necessarily drawn to scale, the following is briefly noted:

FIG. 1 is a flow chart representing an example of processing that can be carried out with the present manufacturing system. On the left hand side column is shown some illustrative steps in a milling procedure through heat treat processing, and on the right hand side column is shown some illustrative steps in grinding and EDM processing.

FIG. 4 is a front plan view of the assembly of FIG. 2, taken along arrow 4.

FIG. 5 is a top plan view of an open bay pallet, which can be employed in the assembly of FIG. 2. The pallet is adjustable as to pitch.

FIG. 6 is a side plan view of the pallet of FIG. 5, taken along arrow 6.

FIG. 7 is a front plan view of the pallet of FIG. 5, taken along arrow 7.

FIG. 26 is a top plan view of a portion of an assembly such as that of FIG. 2, in which work piece and tool storage is provided.

FIG. 27 is a right side plan view of the storage subassembly of FIG. 25.

Figure 2:
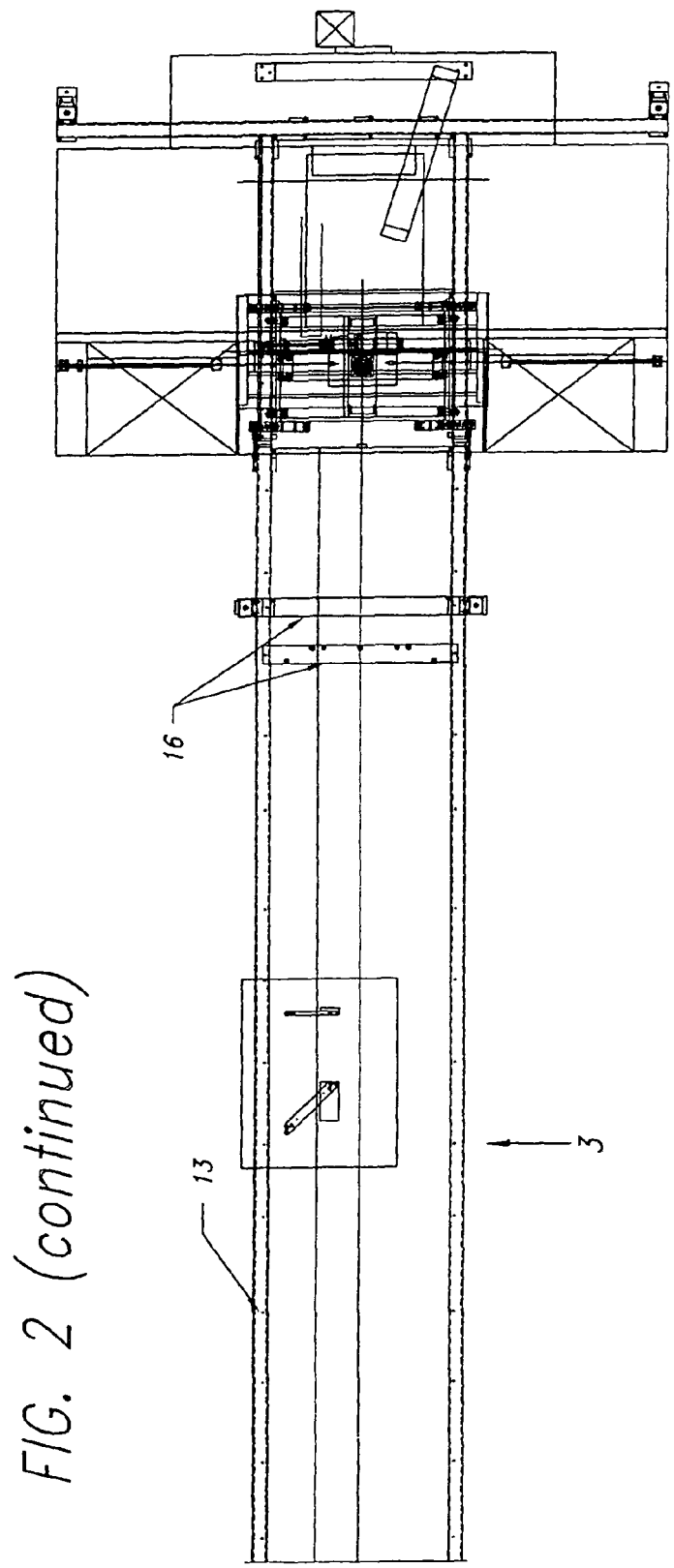
FIG. 2 is a top plan view of an assembly including an open bay pallet, overhead gantry robot, flipping unit, and so forth, especially for grinding and EDM processing.
Figure 3:
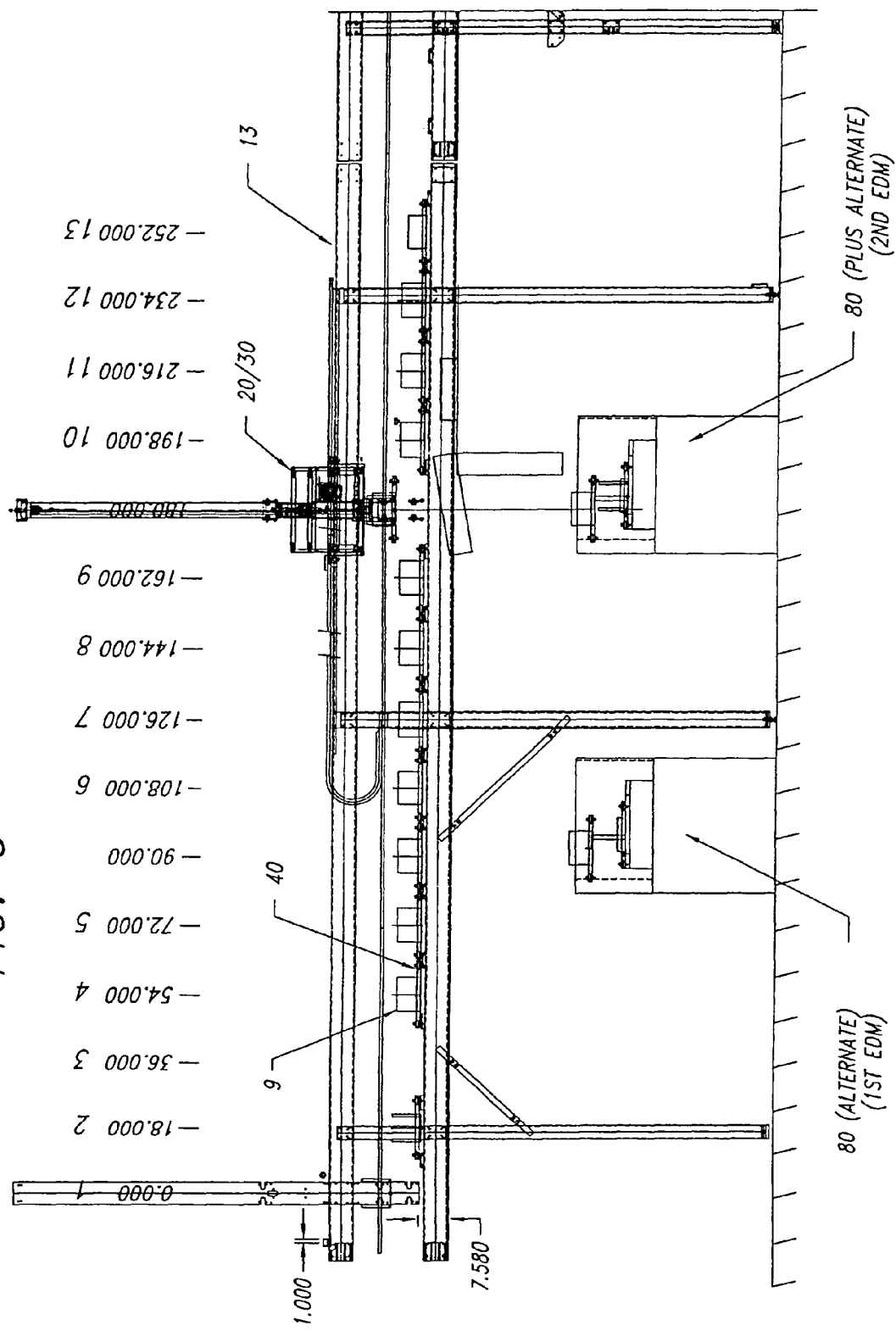
FIG. 3 is a right side plan view of the assembly of FIG. 2, taken along arrow 3.
Figure 3:
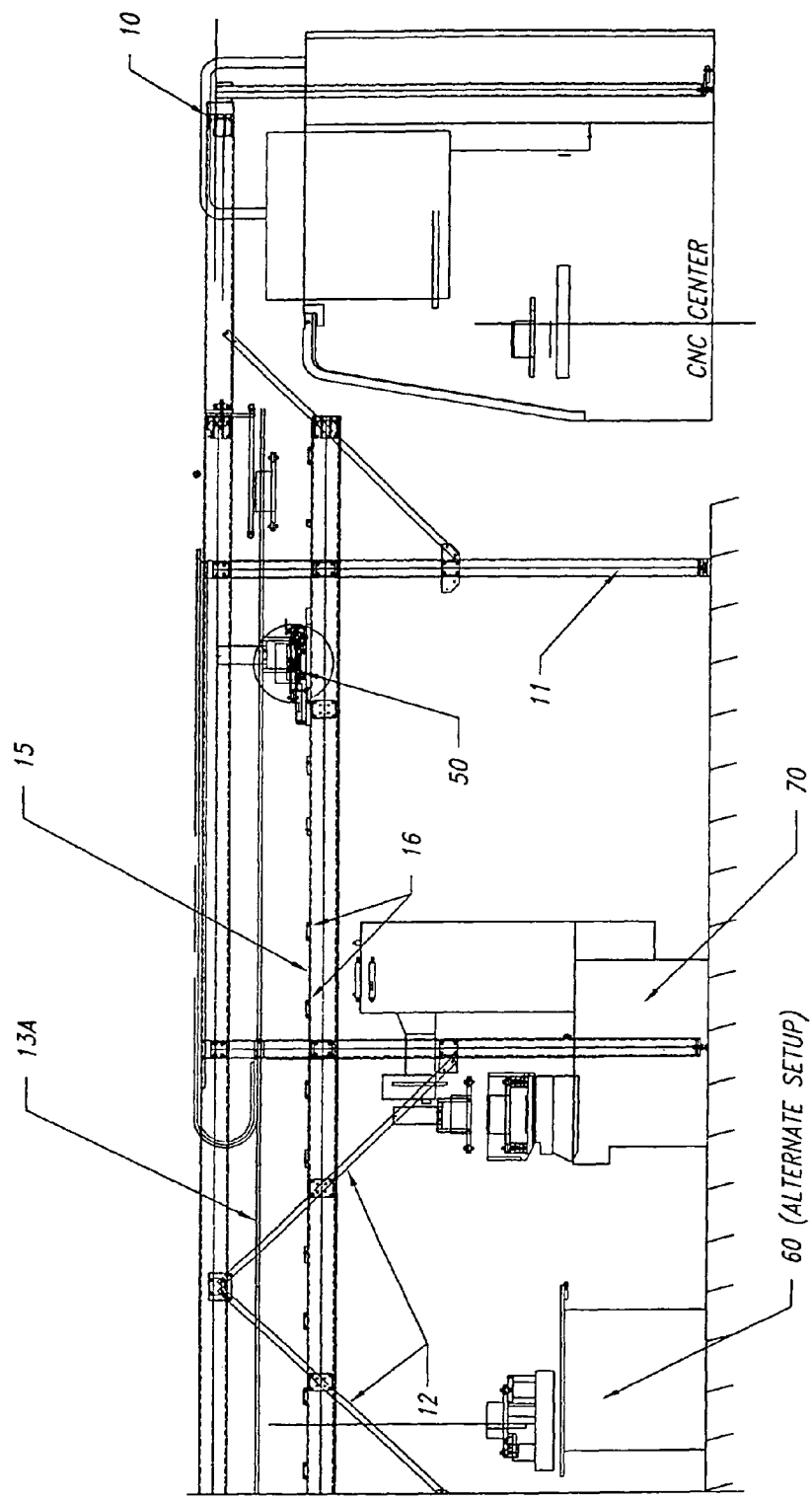
Figure 8:
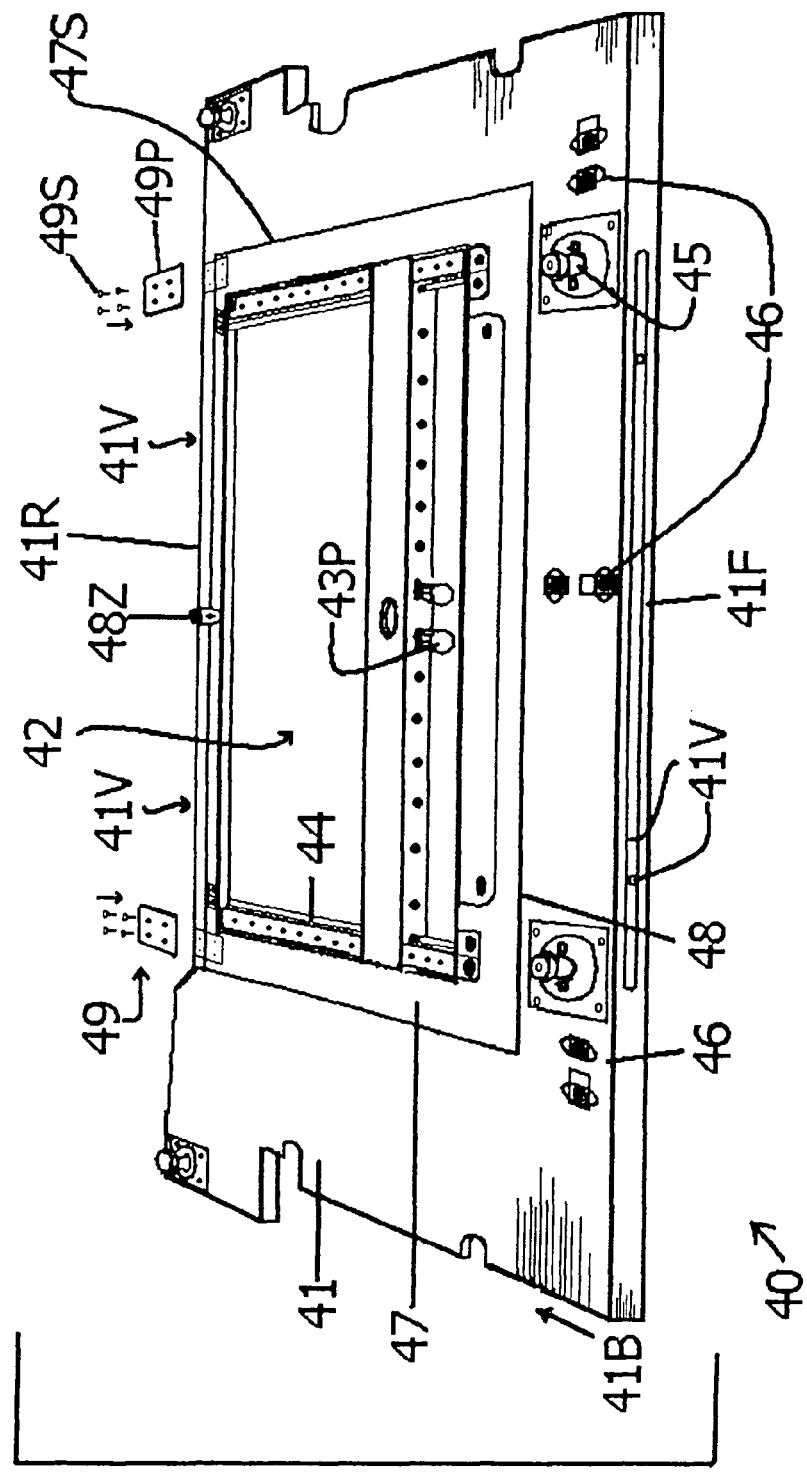
FIG. 8 is a front, top exploded view of a pallet such as of FIGS. 5-7, plus having locking hole and plate features for fixing or locking the adjustable pitch pallet flat.
Figure 9:
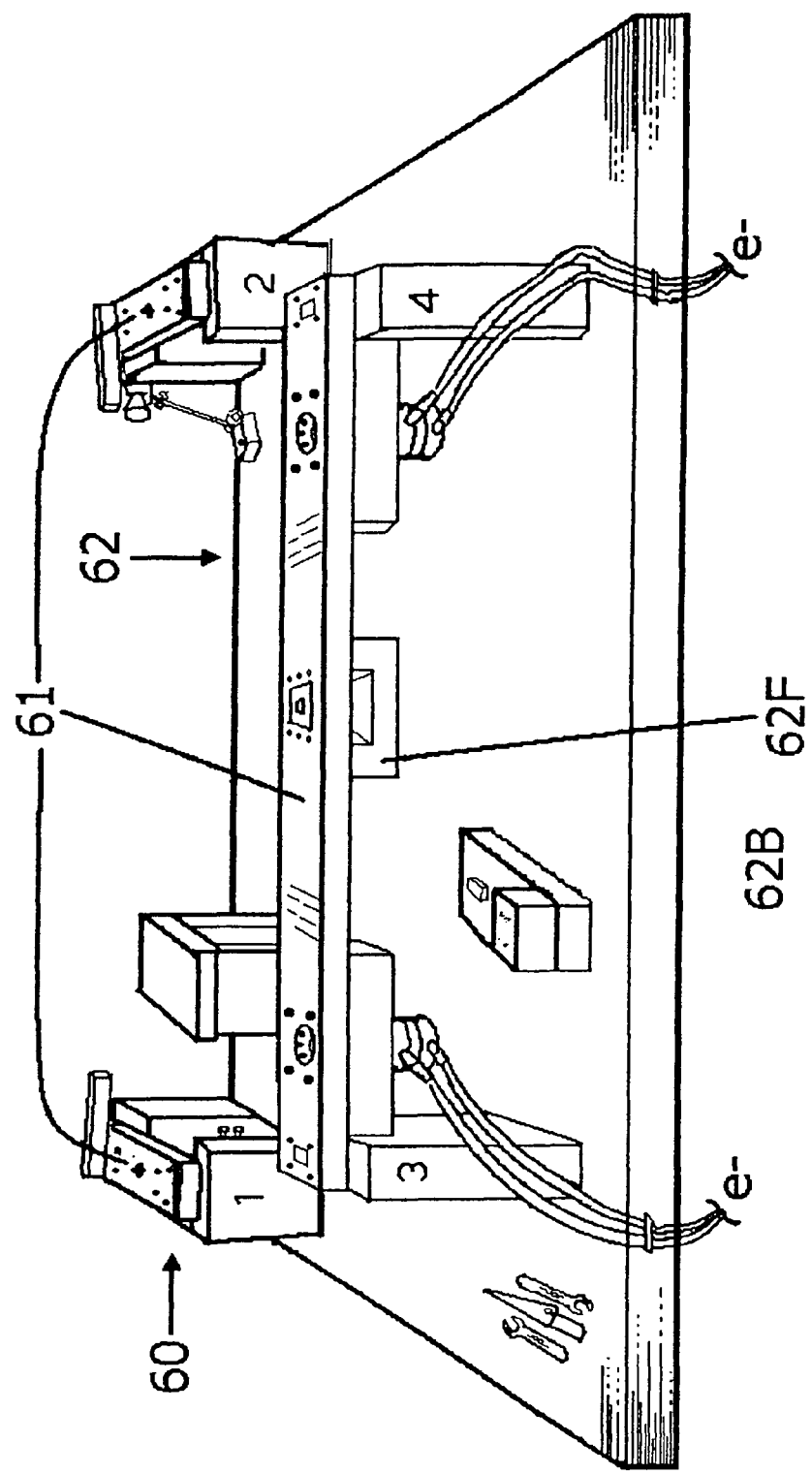
FIG. 9 is a front, top view of a set up station in the assembly of FIGS. 2-4.
Figure 10:
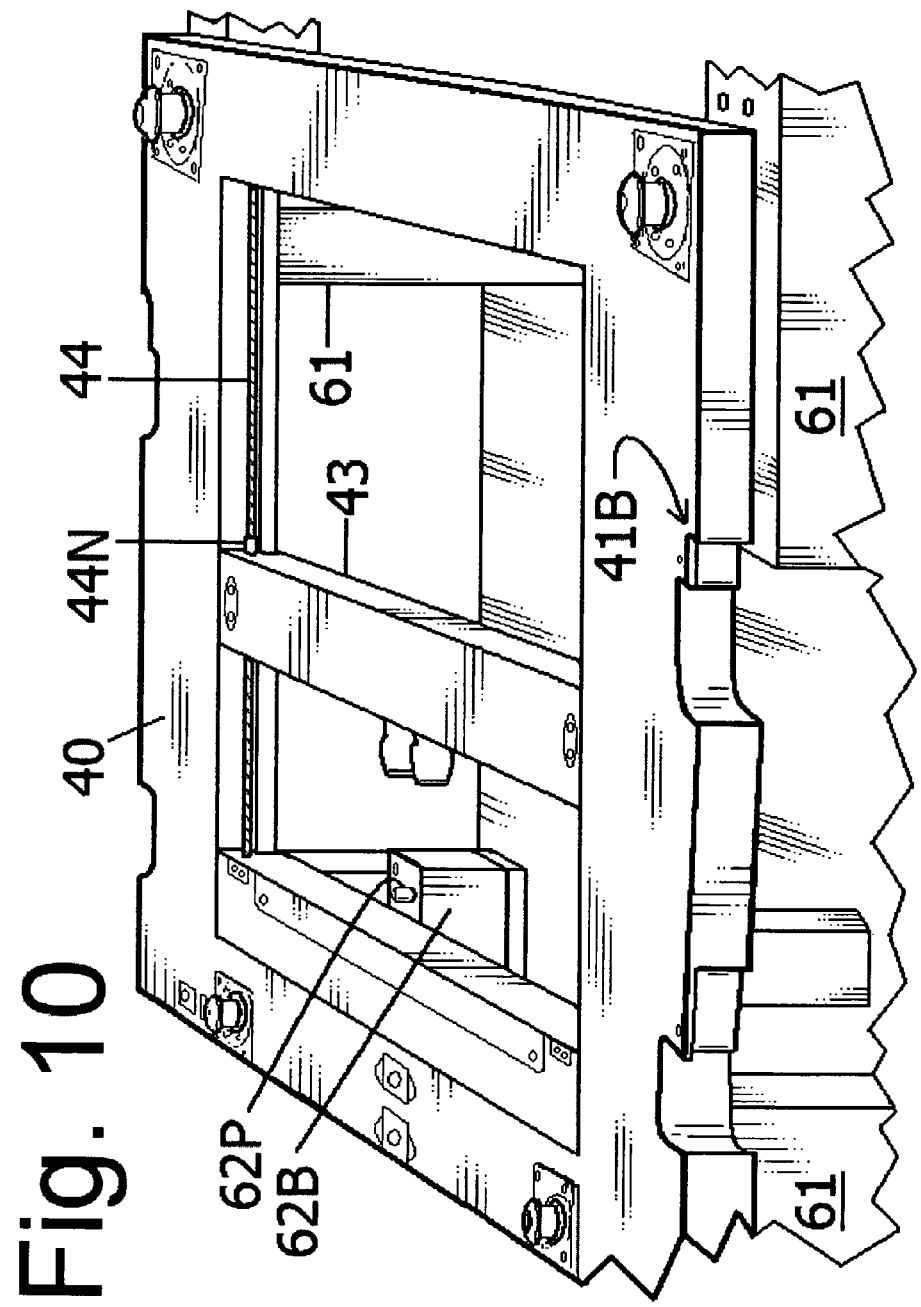
FIG. 10 is a right side, top perspective view of the open bay pallet of FIG. 8 on the set up station of FIG. 9.
Figure 11:
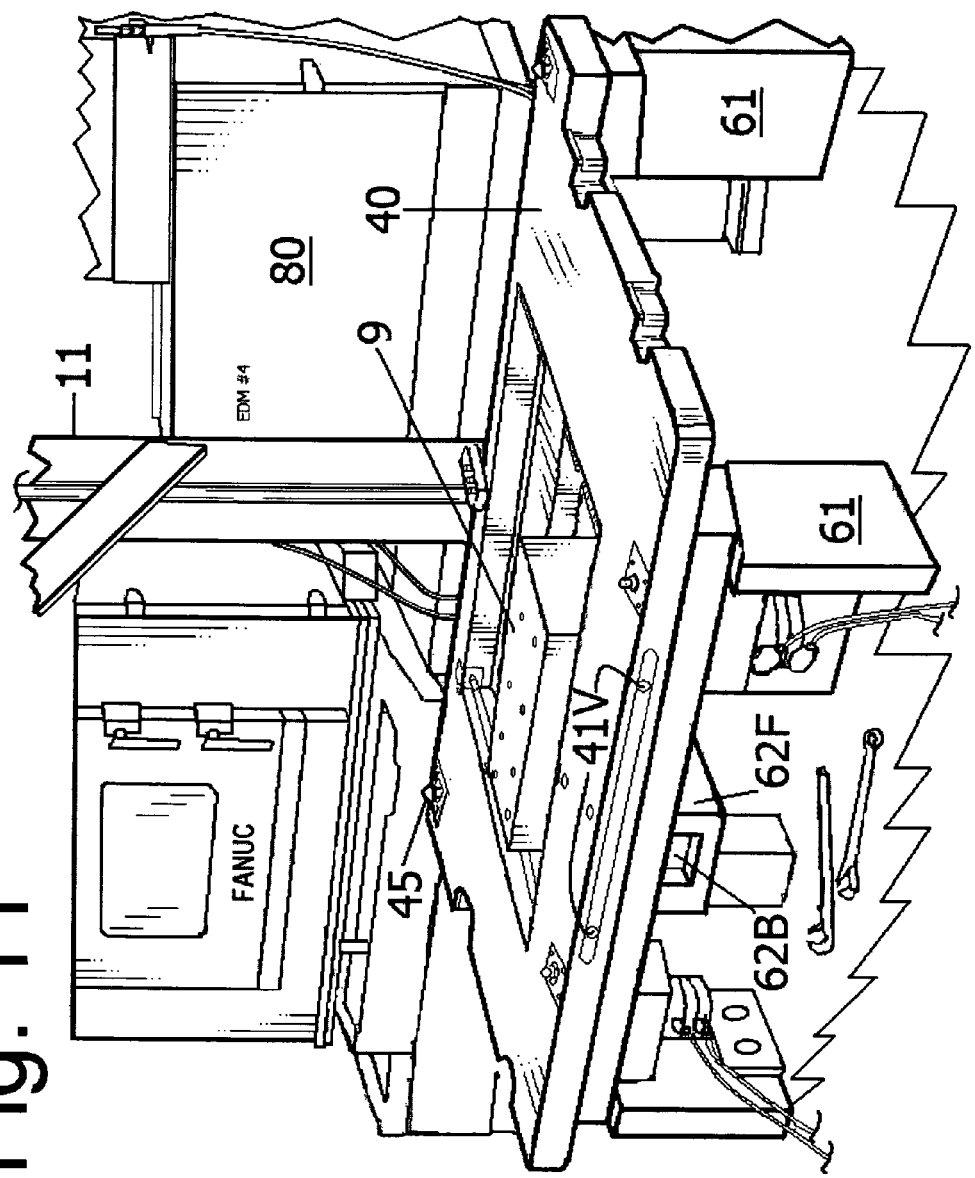
FIG. 11 is a top perspective view, taken from the front, right, of the open bay pallet and set up station as in FIG. 10 having a work piece in the pallet.
Figure 12:
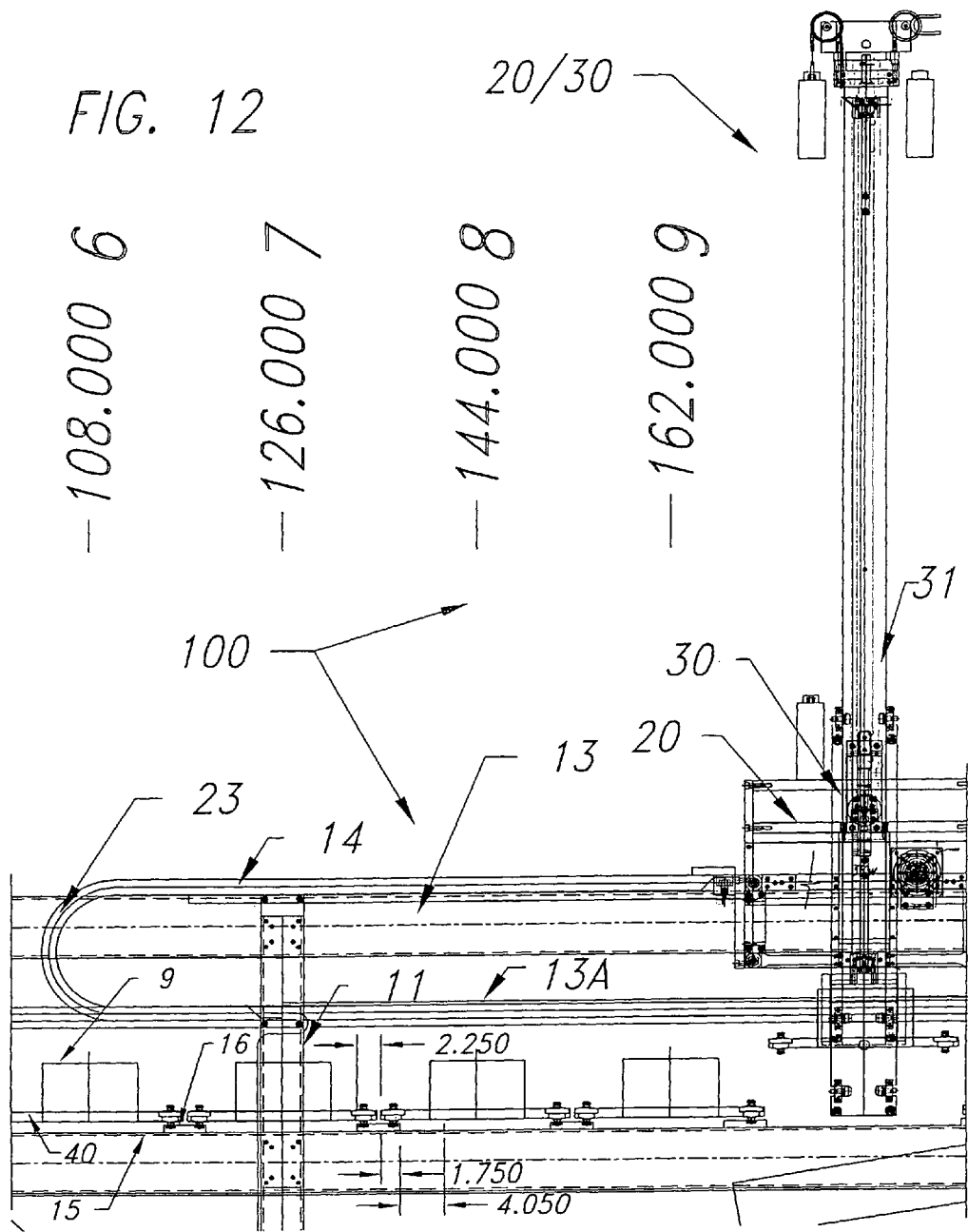
FIG. 12 is a right side plan view of a portion of the assembly of FIG. 2, to include its overhead gantry robot.
Figure 13:
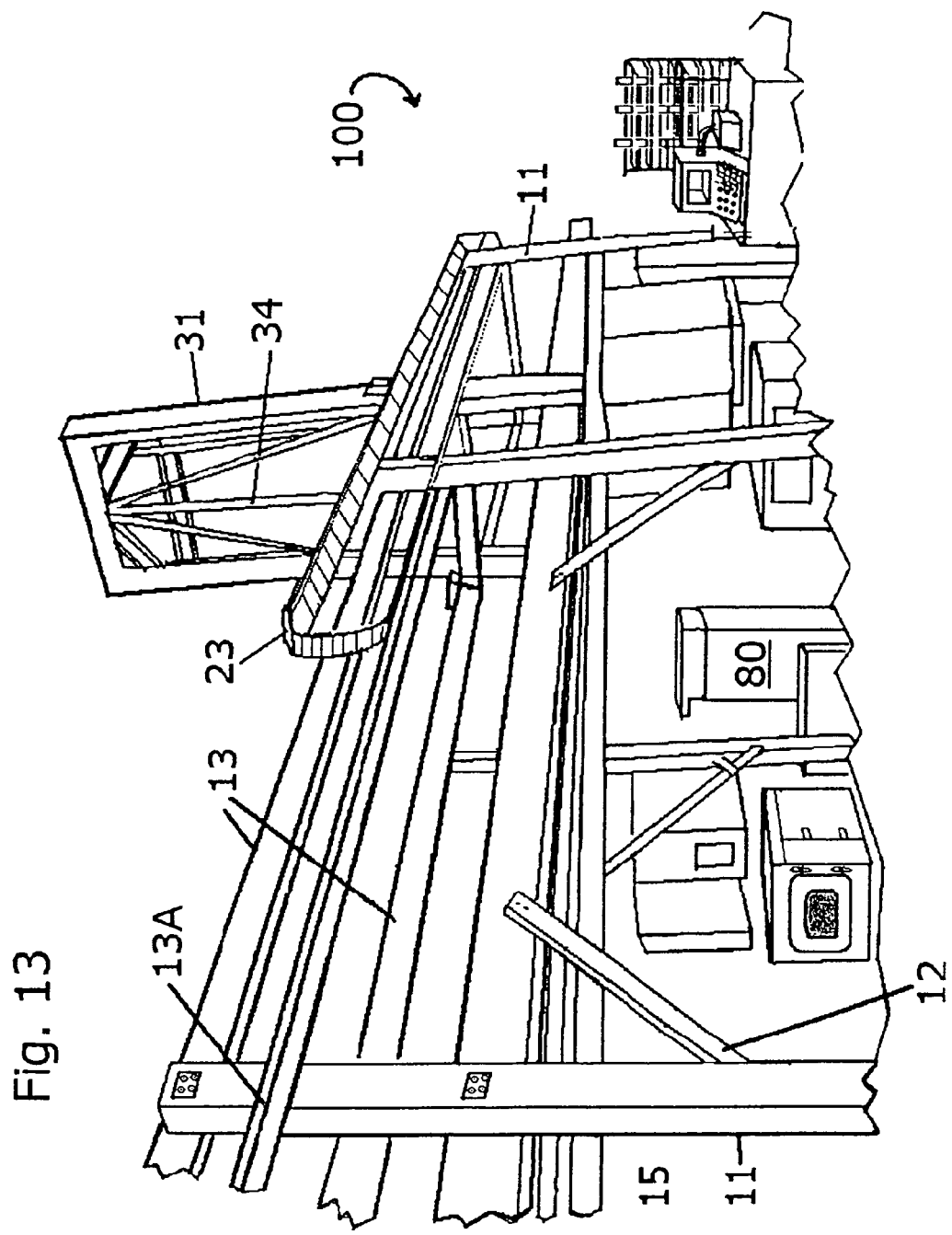
FIG. 13 is a perspective view of an assembly such as shown in FIG. 2, taken from the front, right side, looking up at its overhead gantry robot.
Figure 14:
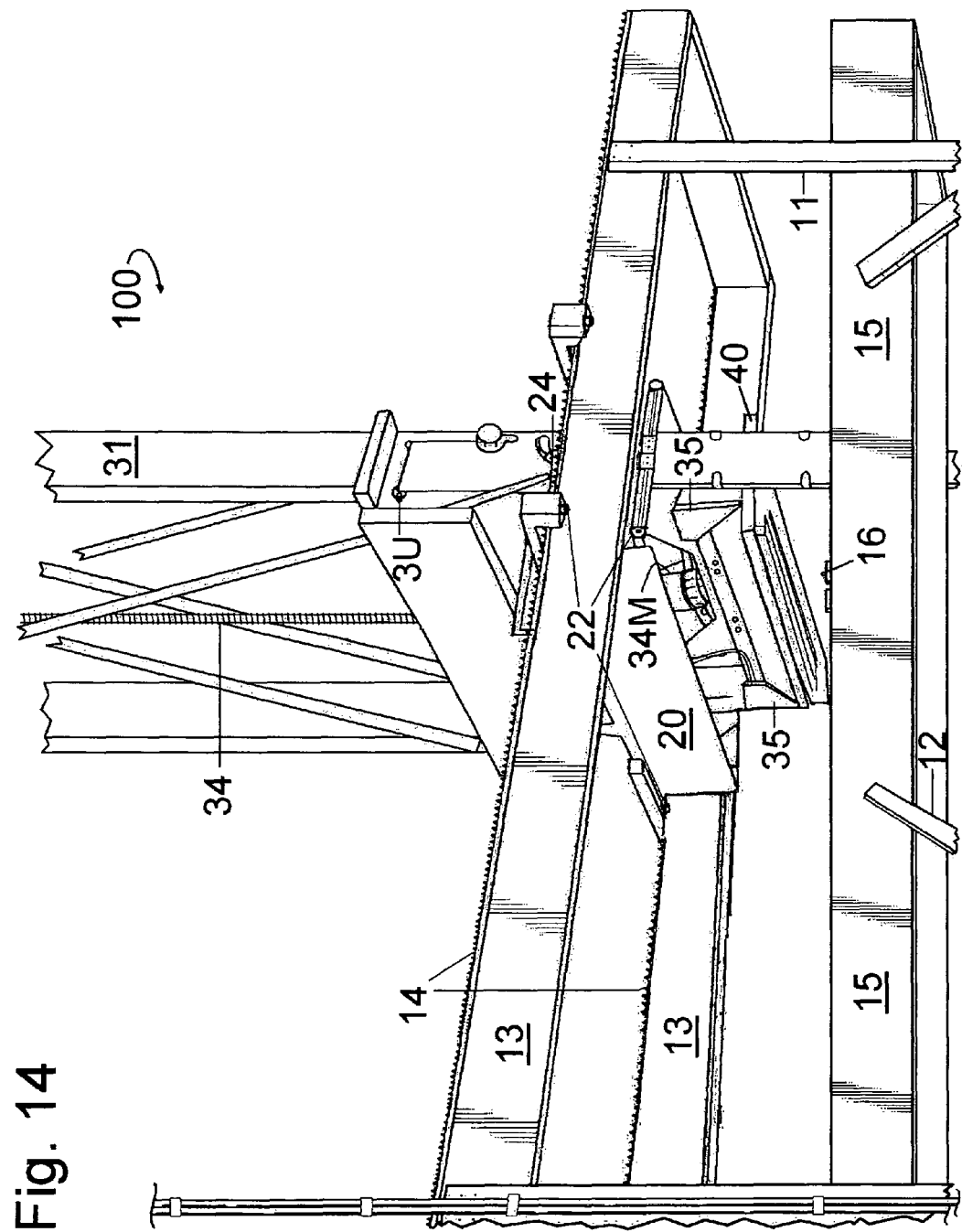
FIG. 14 is another perspective view of the assembly in FIG. 13.
Figure 15:
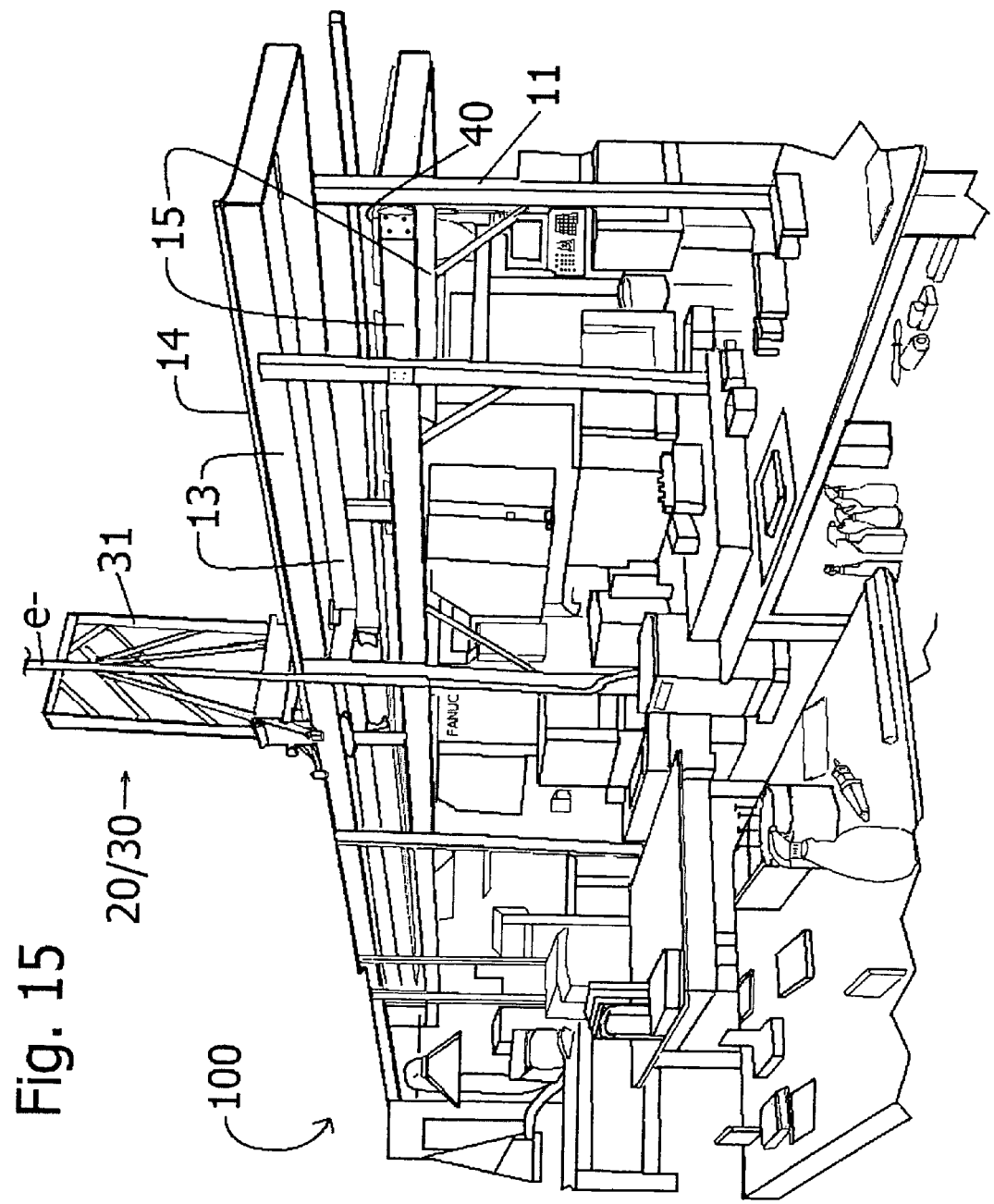
FIG. 15 is another perspective view of the assembly within FIG. 13, taken from the front, left side.
Figure 16:
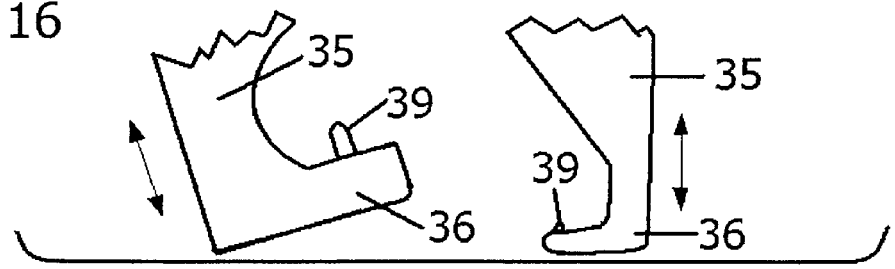
FIG. 16 is a front view of a pair of opposing lift arms of an overhead gantry robot.
Figure 17:
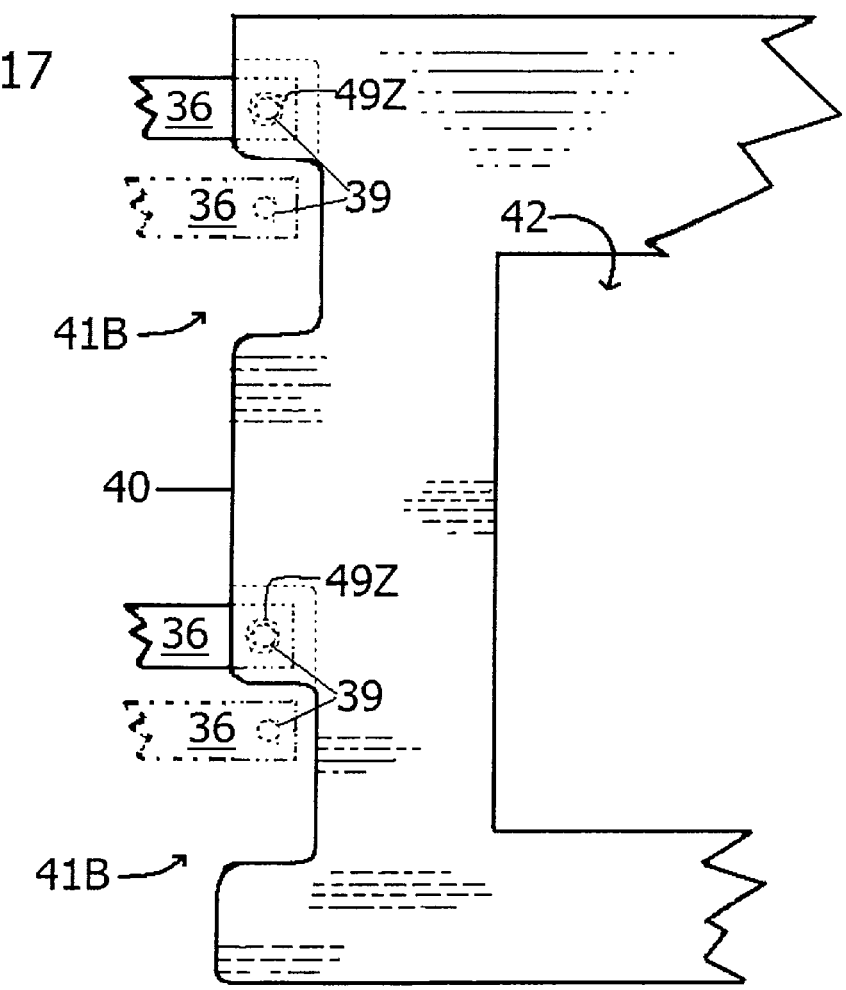
FIG. 17 is a top, plan view of a set of lift arms moving into position to lift or release an open bay pallet.
Figure 18:
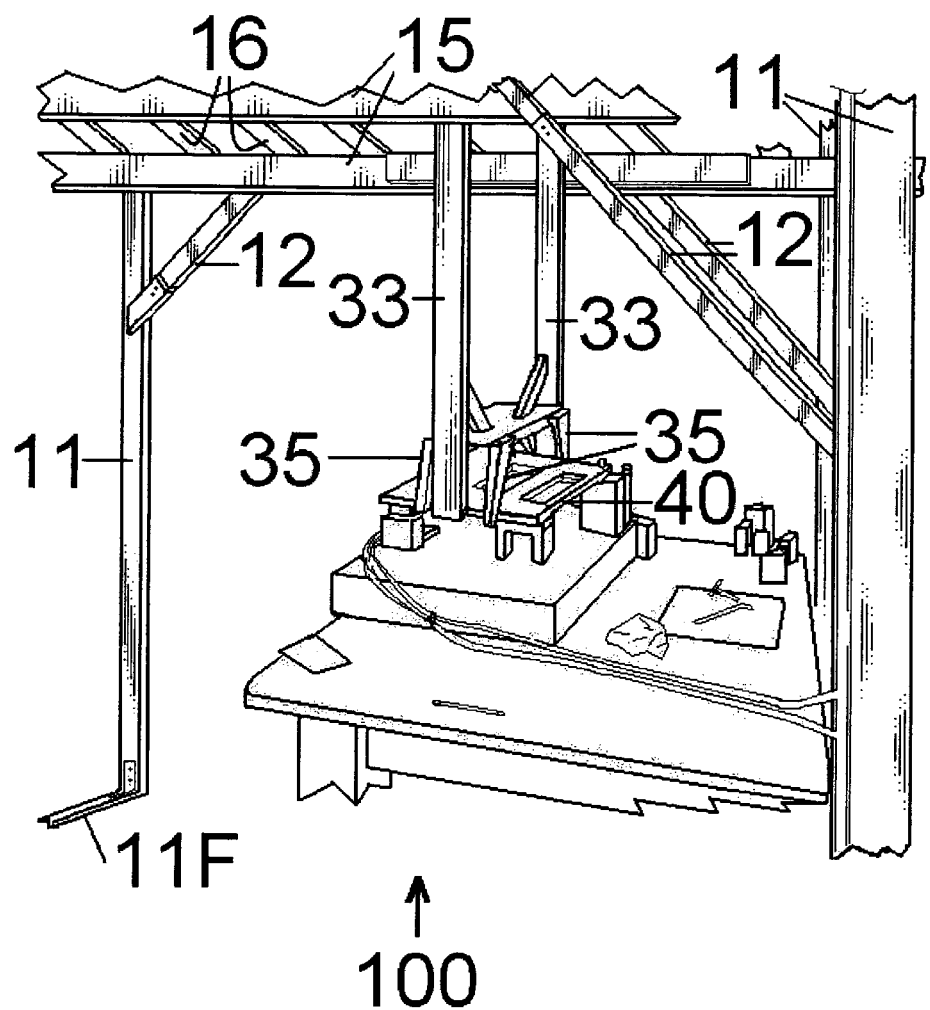
FIG. 18 is a perspective view, taken from the rear, right hand side of the assembly of FIG. 2, with its overhead gantry robot ready to lift or release a pallet at a set up station.
Figure 19:
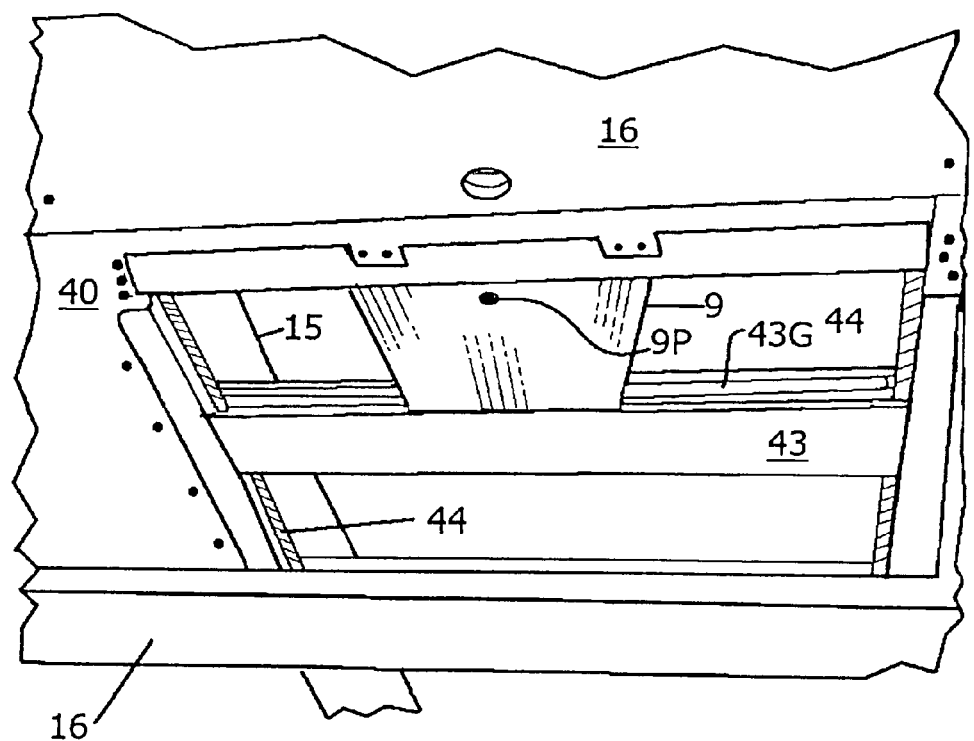
FIG. 19 is a perspective view, taken from the front, bottom, looking up at a pallet in overhead storage in the assembly of FIG. 2.
Figure 20:
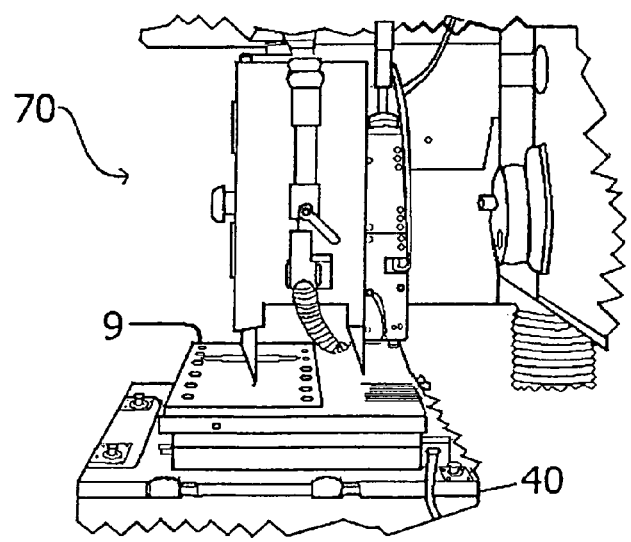
FIG. 20 is a right side perspective view of a work piece in an open bay pallet being operated on at a grinding station in the assembly of FIG. 2.
Figure 21:
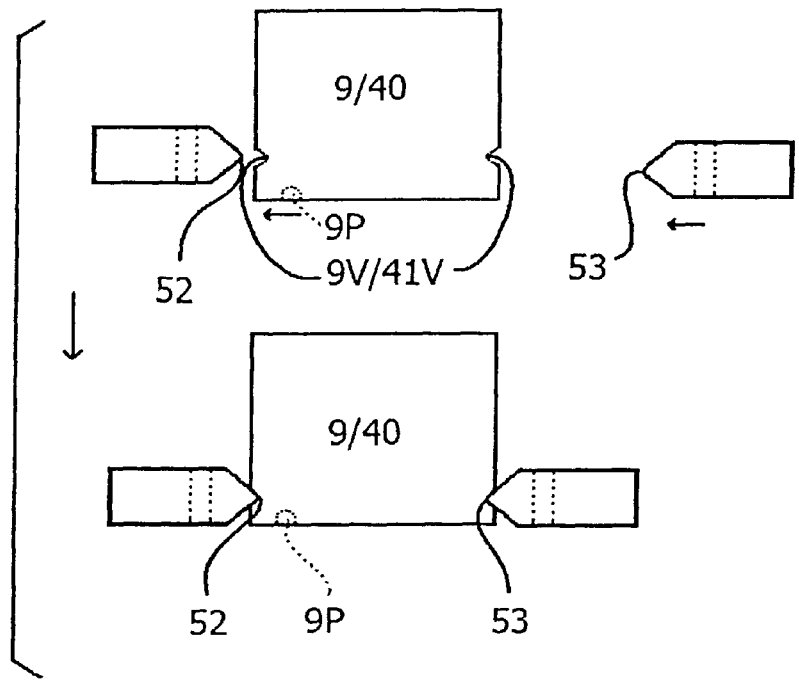
FIG. 21 is a front schematic view of a flip unit coming into position to secure a pallet or work piece for turning it over such as may occur in an assembly as of FIG. 2.
Figure 22:
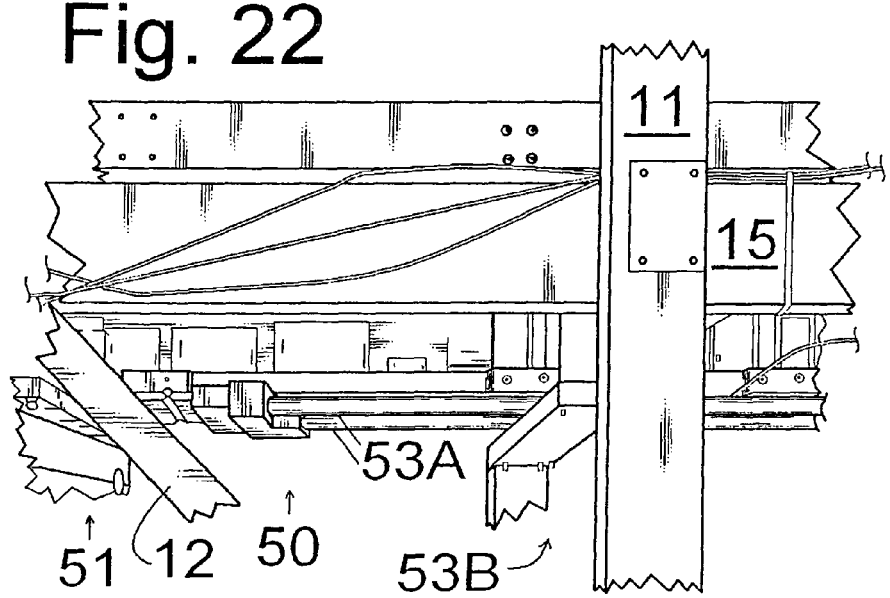
FIG. 22 is a perspective view, taken from the right hand side looking up, at a flip unit in the assembly of FIG. 2, at full extension.
Figure 23:
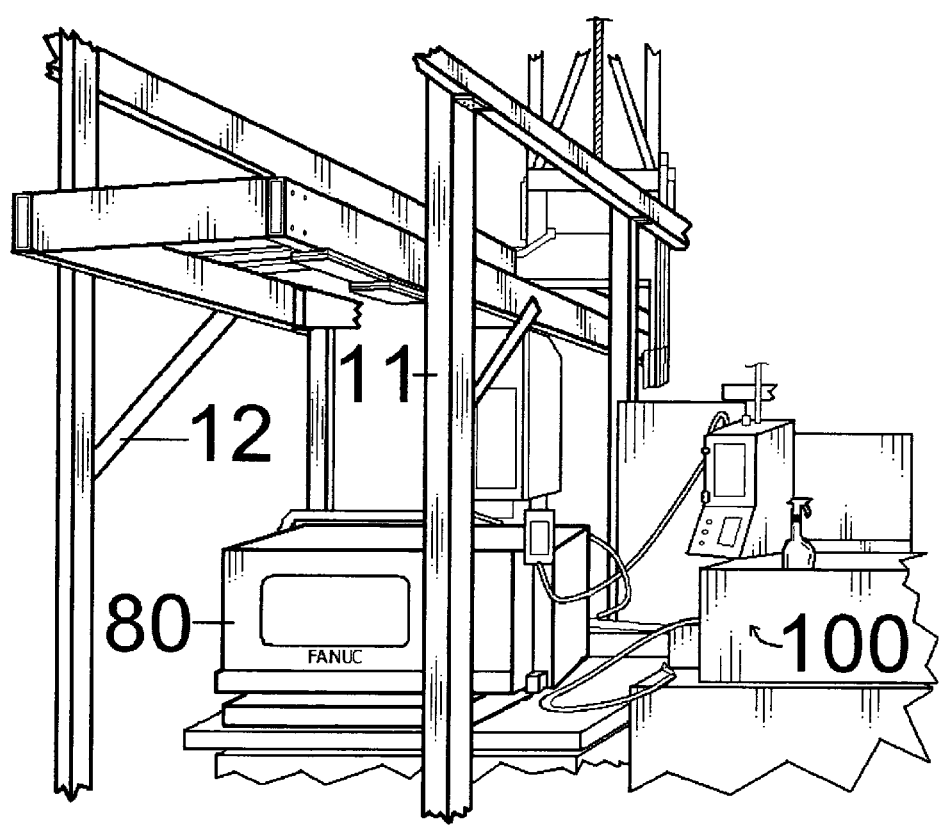
FIG. 23 is a front, right side perspective view of an EDM station as found in an assembly such as of FIG. 2.
Figure 24:
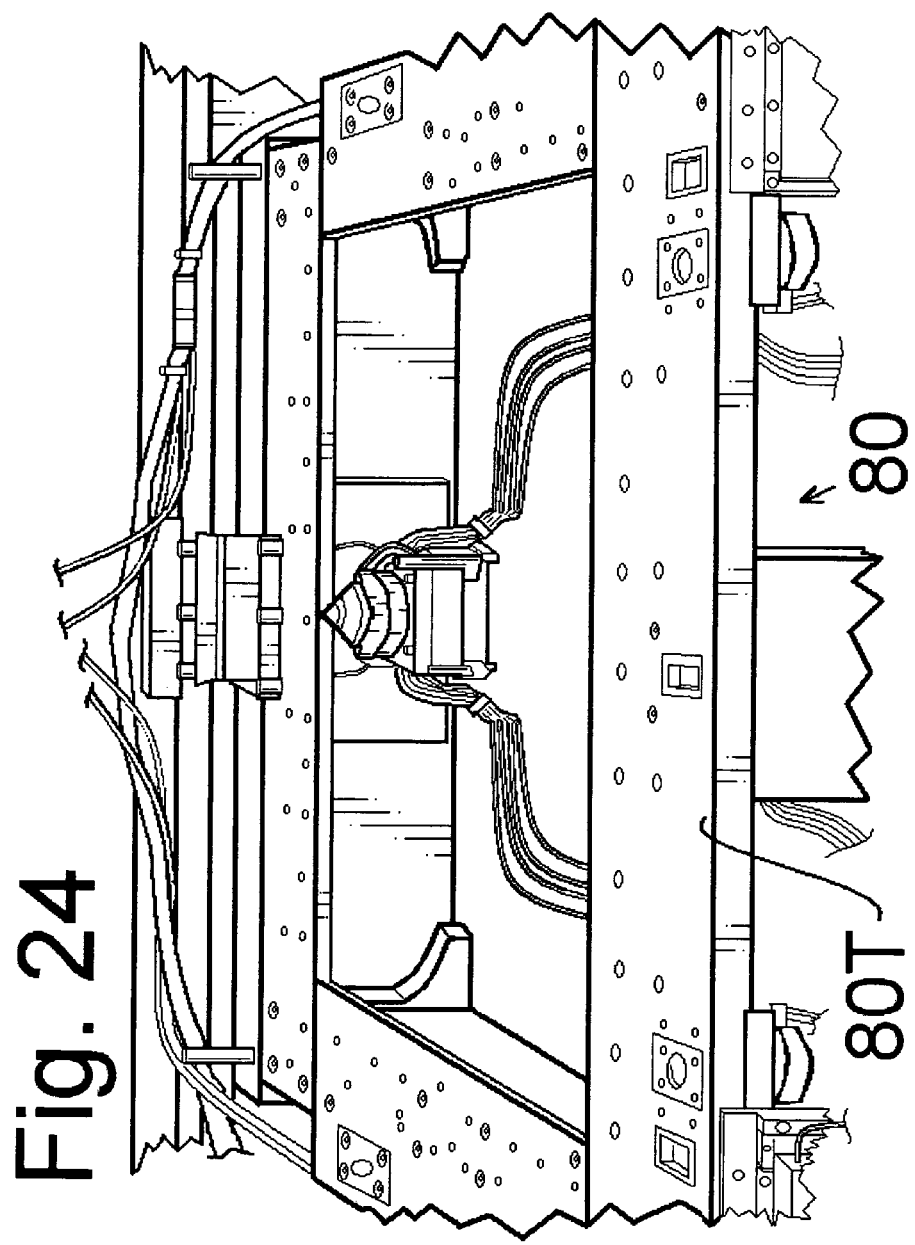
FIG. 24 is a front, top perspective view of an EDM work table in FIG. 23.
Figure 25:
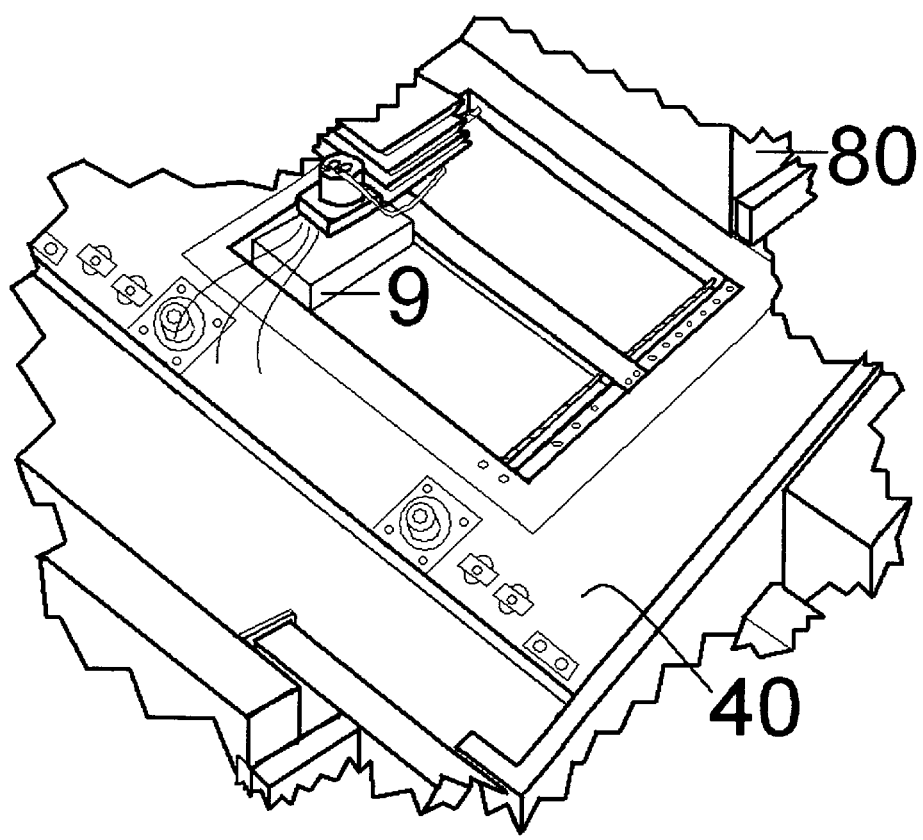
FIG. 25 is a perspective view, taken from the top, front, right side, of EDM processing of a work piece in an open bay pallet in the assembly of FIG. 2.

The invention can be further understood by the detail set forth below, which may be read in view of the drawings. As with the aforementioned matter, such is to be taken in an illustrative and not necessarily limiting sense.

With more particular respect to the drawings, work piece 9, which may be of any suitable size—for example, pertaining to length by width in inches, a 4×4 work piece 9A, a 4×6 work piece 9B, and a 4×8 work piece 9C—and material such as of metal, plastic, ceramic or composite, for example, of steel, which may be provided with a little, say, a ⅛-inch diameter blind positioning hole 9P in its bottom centered from side to side at 0.150 of an inch from a front side, and/or with opposing V-notch grooves or holes 9V, and which can be operated on with portions of assembly 100, say, to make a steel detail for a progressive die. The assembly can include movement/storage system superstructure 10; overhead gantry robot 20/30, with its gantry robot truck 20 and gantry robot lift unit 30; open bay pallet 40; and flipping unit 50. The assembly 100 can include, in general, under the superstructure 10 such stations as set up station 60; grinding station 70; and EDM station 80. Also, the assembly 100 can have under it superstructure 10 or outside its confines and field of operation milling and/or milled work piece and/or tool storage station 90. In general, the assembly 100 provides movement from station to station for the work piece 9 and pallet 40 by its overhead gantry robot 20/30 along two axes: back and forth, horizontally, along a first axis, designated, "x," and up and down, vertically, along a second axis, designated, "z." Such stations as the stations 60, 70, 80, 90 and so forth may be positioned at any convenient position within or in relation to the assembly 100, and may be reconfigured during the lifetime of the assembly 100 according to immediate need. More than one of each of the stations 60, 70, 80, 90 may be employed in the assembly 100, or one or more of such stations may be left out of the assembly 100 or bypassed during its operation on a particular work piece 9. Generally, however, the set up station 60 would be present under the superstructure 10, and one or both of the grinding and EDM station(s) would be present under the superstructure 10 as well.

The movement/storage system superstructure 10 can include vertical support posts 11, say, made from drawn structural steel, which may have attached floor-mounted cross-members 11F; diagonal support beams 12; upper rail set 13, say, made from drawn structural steel and provided in an opposing parallel pair, along which the overhead gantry robot 20/30 can move horizontally; outside gantry distance controlling chain/cable accommodating rail 13A; stationary upper rail rack gear 14; lower rail set 15, say, made from drawn structural steel and provided in an opposing parallel pair, for providing storage areas and fortifying the superstructure; and lower rail cross-members 16 for providing storage and fortifying the superstructure as well. The superstructure 10 can be any suitable length depending on the type and number of machines and storage for the desired capacity of the assembly 100.

The overhead gantry robot 20/30 includes connected components of the gantry robot truck 20 and gantry robot lift unit 30. The gantry robot truck 20 provides computer controlled, precision horizontal motion along the x-axis, and includes roller guide 22; horizontal travel flexible cable/chain carrier 23, which can rest upon the rail 13A; and horizontal pinion gear 24, which is powered by a motor, rotates in a precise manner, and engages the stationary upper rail rack gear 14. The gantry robot lift unit 30 provides computer controlled, precision vertical motion along the z-axis, and includes outer guide rail 31, which can be provided with minimal friction roller guide 31A; z-axis lift member 33, which is guided by the rail 31 and roller guide 31A, and which is raised and lowered through ball screw 34 powered by motor 34M; and lift hook assembly 35 connected to the lower extremity of the lift member 33, which may be provided in a set of two opposing, mirror image pairs and include lift hook finger 36 from an upper surface of which projects lift hook locating pin 39.

The open bay pallet 40 can be made of any suitable material such as a suitable metal, ceramic or composite, say, steel, and can include outer housing 41, which can have outer lift bay area structure 41B and front 41F and rear 41R portions, and may have as well flipping V-grooves or holes 41V front and rear, and be about open inside bay 42; adjustable clamp member 43, say, in a form of a bar, which may be provided with adjustable clamping pads 43C and/or horizontal groove 43G, into which a small spacer such as a rod, ball and so forth may be inserted as well as being inserted into a corresponding groove of a work piece 9 and squeezed with the bar 43, all for better holding the work piece 9, and which bar 43 can be provided with internal female threads so as to mount on a set of two parallel threaded rods 44 on opposite sides of the bay 42, say, running from front to rear, which threaded rods 44 may be manually rotatable and locked into position with nuts 44N so as to adjust and secure the front to rear position of the bar 43; and clamping knob/net pad 45 to control necessary height, which may be provided in symmetric sets, even top and bottom; and locating pilots 46. The pallet 40 may be equipped with inner pivotable housing 47 that is separated from the outer housing 41 with slit 47S yet connected with living hinge 48 so that pitch of the inner housing 47 may be adjusted by z-axis pitch screw adjusting unit 48Z with a particular work piece 9 in mind; and perhaps level pitch locking assembly 49, which can include plates 49P and screws 49S, so as to lock up at a level pitch such that the entire top surface of a pallet 40 with its outer and inner housings 41, 47 goes along the same plane if desired. The pallet 40 with or without the work piece 9 is moved by the overhead gantry robot 20/30 by having the set of lift hook fingers 36 lowered into position in the outer lift bay structure 41B areas lower than the pallet 40, moved horizontally under the pallet 40 in the outer lift bay structure 41B areas so that the lift hook locating pins 39 align with and enter into corresponding locating holes 49Z in undersides of the outer lift bay structure 41B areas with lifting of the robot 20/30 to position the same, and then substantially lifted up and transported in the assembly 100.

The flipping unit 50 includes rotating body 51, which is suitably powered, say, by pneumatic action. Stationary V-notch points 52 are at an end of the rotating body 51; and movable V-notch points 53 are at extremities of extension arms 53A of freely rotating body 53B. The V-notch points can engage the work piece V-grooves or holes 9V or the pallet V-grooves or holes 41V to provide for precise and secure 180-degree flipping. The set up station 60 can include receiver net pads 61 and left-right centering unit 62, which may include block 62B insertable into frame 62F. The insertable block 62B has upstanding positioning pin 62P to go into the positioning hole 9P in the work piece 9. Set up may be generally manual, with the set up work piece 9 in the pallet 40 then being moved automatically by the elevated gantry robot 20/30 for storage and operation within the assembly 100.

The grinding station(s) 70 perform(s) grinding and associated tasks.

The EDM station(s) 80 may include table 80T. It perform(s) EDM processing.

The milling and/or milled work piece and/or tool storage station 90 performs its assigned tasks, and it may be positioned under the superstructure 10 of the assembly 100 or outside its confines and field of operation. Work piece 9 and tool 99 storage and retrieval under the confines and field of operation of the superstructure 10 can employ the x-axis and z-axis movement provided by the overhead gantry robot 20/30 plus y-axis horizontal movement provided by a table precisely movable from side to side, upon which the work pieces 9 and tools 99 can be stored in an array recognized by CNC center activity. Receptacles for the tools 99 can be provided.

The present invention is thus provided. Various feature(s), part(s), step(s), subcombination(s) and/or combination(s) can be employed with or without reference to other feature(s), part(s), step(s), subcombination(s) and/or combination(s) in the practice of the invention, and numerous and sundry adaptations and modifications can be effected within its spirit, the literal claim scope of which is particularly pointed out as follows:

What is claimed is:

1. A manufacturing system apparatus, which comprises an overhead gantry and/or flipping unit including a superstructure and at least one station under the superstructure, wherein the unit can be employed to move from station to station when there are a plurality of stations and/or flip a work piece by itself or the work piece mounted on or in an industrial pallet, and wherein:
    moving of the work piece from station to station when there are a plurality of stations is carried out under the superstructure with the work piece mounted on or in the industrial pallet; and
    flipping of the of the work piece is carried out under the superstructure with the work piece by itself or mounted on or in the industrial pallet; and
    at least one of the following features A and B below is present:
        A. the industrial pallet embraces a body with an open bay, in which a securable work piece can be secured such that the securable work piece can be worked on from either side of the industrial pallet; and
        B. the apparatus includes at least one of a set up station; a grinding station; an EDM station; and a milling and/or milled work piece and/or tool storage station.

2. The apparatus of claim 1, wherein robotic moving and/or loading is provided with the overhead gantry, making it an overhead gantry robot, which has two axes of motion only, an x-axis and a z-axis, and which includes connected components of a gantry robot truck and a gantry robot lift unit.

3. The apparatus of claim 1, which includes the industrial pallet.

4. The apparatus of claim 3, which includes feature A, wherein the industrial pallet embraces the body with an open bay, in which a securable work piece can be secured such that the securable work piece can be worked on from either side of the industrial pallet.

5. The apparatus of claim 4, wherein the industrial pallet includes an outer housing; and an adjustable clamp member within the outer housing so as to be within the open bay of the industrial pallet, which can hold the securable work piece in the open bay of the industrial pallet.

6. The apparatus of claim 1, which includes feature B, the at least one of a set up station; a grinding station; an EDM station; and a milling and/or milled work piece and/or tool storage station.

7. A manufacturing system apparatus, which comprises an overhead gantry and/or flipping unit including a superstructure and at least one station under the superstructure, wherein the unit can be employed to move from station to station when there are a plurality of stations and/or flip a work piece by itself or the work piece mounted on or in an industrial pallet, wherein the industrial pallet is present and includes a body with an open bay, in which the work piece can be secured such that it can be worked on from either side of the industrial pallet, which also includes:
    an outer housing;
    an adjustable clamp member within the outer housing so as to be within the open bay of the industrial pallet, which can hold the work piece in the open bay of the industrial pallet;
    an inner pivotable housing that is separable from yet connectable with the outer housing;
    a z-axis pitch adjusting unit such that pitch of the inner housing can be adjusted by the z-axis pitch adjusting unit; and at least one of the following features (A, B):
(A) an outer lift bay area structure in the outer housing; and
(B) a clamping knob/net pad to control necessary height in operation.

8. The apparatus of claim 7, wherein robotic moving and/or loading is provided with the overhead gantry, making it an overhead gantry robot, which has two axes of motion only, an x-axis and a z-axis, and which includes connected components of a gantry robot truck and a gantry robot lift unit.

9. The apparatus of claim 8, wherein:
the movement/storage system superstructure includes:
vertical support posts;
an upper rail set provided as an opposing parallel pair, along which the overhead gantry robot can move horizontally;
an outside gantry distance controlling chain/cable accommodating rail;
a stationary upper rail rack gear;
a lower rail set provided as an opposing parallel pair, which can provide storage areas and fortify the superstructure; and
lower rail cross-members, which can provide storage and fortify the superstructure as well;
the gantry robot truck provides for computer controlled, precision horizontal motion along the x-axis, and includes:
a roller guide;
a horizontal travel flexible cable/chain carrier, which can rest upon the outside gantry distance controlling chain/cable accommodating rail; and
a horizontal pinion gear, which is powered, can rotate in a precise manner, and engages the stationary upper rail rack gear; and
the gantry robot lift unit provides for computer controlled, precision vertical motion along the z-axis, and includes:
an outer guide rail;
a z-axis lift member, which is guided by the outer guide rail and the roller guide, and which can be raised and lowered through a ball screw that is powered; and
a lift hook assembly connected to a lower extremity of the z-axis lift member, which is provided as a set of two opposing, mirror image pairs, each of which includes a lift hook finger.

10. The apparatus of claim 9, wherein the flipping unit includes a rotating body, which is powered; and stationary V-notch points are at an end of the rotating body, and movable V-notch points are at extremities of extension arms of a freely rotating body such that the V-notch points can engage V-grooves or holes in the work piece and/or the pallet so as to provide for precise and secure 180-degree flipping.

11. The apparatus of claim 10, wherein, with respect to the industrial pallet, the outer housing includes flipping V-grooves and/or holes, front and rear; the adjustable clamp member is in a form of a bar, which is provided with adjustable clamping pads and a horizontal groove, into which a small spacer can be inserted as well as being inserted into any corresponding groove of the work piece and squeezed with the bar to better hold the work piece, and which bar is provided with internal female threads and a set of two parallel threaded rods and nuts on opposite sides of the open bay, with the threaded rods running from front to rear and which threaded rods can be rotated and locked into position with the nuts so as to adjust and secure the front to rear position of the bar; the clamping knob/net pad is provided in symmetric sets and includes associated locating pilots; the inner pivotable housing is separated from the outer housing with a slit and connected with the outer housing with a living hinge; and the z-axis pitch adjusting unit includes a z-pitch adjusting screw.

12. The apparatus of claim 8, wherein the flipping unit includes a rotating body, which is powered; and stationary V-notch points are at an end of the rotating body, and movable V-notch points are at extremities of extension arms of a freely rotating body such that the V-notch points can engage V-grooves or holes in the work piece and/or the pallet so as to provide for precise and secure 180-degree flipping.

13. The apparatus of claim 12, wherein, with respect to the industrial pallet, the outer housing includes flipping V-grooves and/or holes, front and rear; the adjustable clamp member is in a form of a bar, which is provided with adjustable clamping pads and a horizontal groove, into which a small spacer can be inserted as well as being inserted into any corresponding groove of the work piece and squeezed with the bar to better hold the work piece, and which bar is provided with internal female threads and a set of two parallel threaded rods and nuts on opposite sides of the open bay, with the threaded rods running from front to rear and which threaded rods can be rotated and locked into position with the nuts so as to adjust and secure the front to rear position of the bar; the clamping knob/net pad is provided in symmetric sets and includes associated locating pilots; the inner pivotable housing is separated from the outer housing with a slit and connected with the outer housing with a living hinge; and the z-axis pitch adjusting unit includes a z-pitch adjusting screw.

14. The apparatus of claim 7, wherein the flipping unit includes a rotating body, which is powered; and stationary V-notch points are at an end of the rotating body, and movable V-notch points are at extremities of extension arms of a freely rotating body such that the V-notch points can engage V-grooves or holes in the work piece and/or the pallet so as to provide for precise and secure 180-degree flipping.

15. The apparatus of claim 14, wherein, with respect to the industrial pallet, the outer housing includes flipping V-grooves and/or holes, front and rear; the adjustable clamp member is in a form of a bar, which is provided with adjustable clamping pads and a horizontal groove, into which a small spacer can be inserted as well as being inserted into any corresponding groove of the work piece and squeezed with the bar to better hold the work piece, and which bar is provided with internal female threads and a set of two parallel threaded rods and nuts on opposite sides of the open bay, with the threaded rods running from front to rear and which threaded rods can be rotated and locked into position with the nuts so as to adjust and secure the front to rear position of the bar; the clamping knob/net pad is provided in symmetric sets and includes associated locating pilots; the inner pivotable housing is separated from the outer housing with a slit and connected with the outer housing with a living hinge; and the z-axis pitch adjusting unit includes a z-pitch adjusting screw.

16. A method for making a part, which comprises carrying out the following steps, which are not necessarily conducted in series, such that the part is made thereby:
providing a work piece;
providing a manufacturing system apparatus, which embraces an overhead gantry and/or flipping unit including a superstructure and at least one station under the superstructure, wherein the unit can be employed to move from station to station when there is a plurality of stations and/or flip the work piece by itself or the work piece mounted on or in an industrial pallet, wherein at least one of the following features (A, B, C) is present:
(A) moving of the work piece from station to station when there are a plurality of stations is carried out under the superstructure with the work piece mounted on or in the industrial pallet; and flipping of the of the work piece is carried out under the superstructure with the work piece by itself or mounted on or in the industrial pallet;
(B) robotic moving and/or loading is provided with the overhead gantry, making it an overhead gantry robot, which has two axes of motion only, an x-axis and a z-axis, and which includes connected components of a gantry robot truck and a gantry robot lift unit, wherein:
  the movement/storage system superstructure includes vertical support posts; an upper rail set provided as an opposing parallel pair, along which the overhead gantry robot can move horizontally; an outside gantry distance controlling chain/cable accommodating rail; a stationary upper rail rack gear; a lower rail set provided as an opposing parallel pair, which can provide storage areas and fortify the superstructure; and lower rail cross-members, which can provide storage and fortify the superstructure as well;
  the gantry robot truck provides for computer controlled, precision horizontal motion along the x-axis, and includes a roller guide; a horizontal travel flexible cable/chain carrier, which can rest upon the outside gantry distance controlling chain/cable accommodating rail; and a horizontal pinion gear, which is powered, can rotate in a precise manner, and engages the stationary upper rail rack gear; and
  the gantry robot lift unit provides for computer controlled, precision vertical motion along the z-axis, and includes an outer guide rail; a z-axis lift member, which is guided by the outer guide rail and the roller guide, and which can be raised and lowered through a ball screw that is powered; and a lift hook assembly connected to a lower extremity of the z-axis lift member, which is provided as a set of two opposing, mirror image pairs, each of which includes a lift hook finger; and
(C) the flipping unit includes a rotating body, which is powered; and stationary V-notch points are at an end of the rotating body, and movable V-notch points are at extremities of extension arms of a freely rotating body such that the V-notch points can engage V-grooves or holes in the work piece and/or the pallet so as to provide for precise and secure 180-degree flipping;
providing the work piece to the apparatus;
carrying out at least one of the following steps (A', B'):
  (A') moving the work piece with the overhead gantry to and/or from at least one station of the at least one station under the superstructure; and
  (B') flipping the work piece with the flipping unit; and
working on the work piece at least one station of the at least one station under the superstructure.

17. The method of claim 16, wherein the work piece is mounted in the industrial pallet, which embraces a body with an open bay, in which the work piece can be secured such that it can be worked on from either side of the industrial pallet.

18. The method of claim 17, which is computer controlled, and wherein robotic moving and/or loading is carried out with the overhead gantry, making it an overhead gantry robot, which has two axes of motion only, an x-axis and a z-axis, and which includes connected components of a gantry robot truck and a gantry robot lift unit.

19. The method of claim 18, wherein:
the work piece includes a work piece positioning hole;
the movement/storage system superstructure includes:
  vertical support posts;
  an upper rail set provided as an opposing parallel pair, along which the overhead gantry robot can move horizontally;
  an outside gantry distance controlling chain/cable accommodating rail;
  a stationary upper rail rack gear;
  a lower rail set provided as an opposing parallel pair, which can provide storage areas and fortify the superstructure; and
  lower rail cross-members, which can provide storage and fortify the superstructure as well;
the gantry robot truck provides for the computer controlled, precision horizontal motion along the x-axis, and includes:
  the roller guide;
  the horizontal travel flexible cable/chain carrier, which can rest upon the outside gantry distance controlling chain/cable accommodating rail; and
  the horizontal pinion gear, which is powered, can rotate in the precise manner, and engages the stationary upper rail rack gear;
the gantry robot lift unit provides for the computer controlled, precision vertical motion along the z-axis, and includes;
  the outer guide rail;
  the z-axis lift member, which is guided by the outer guide rail and the roller guide, and which can be raised and lowered through the ball screw that is powered; and
  the lift hook assembly connected to the lower extremity of the z-axis lift member, which is provided as the set of two opposing, mirror image pairs, each of which includes the lift hook finger;
the flipping unit includes:
  the rotating body, which is powered; and
  the stationary V-notch points at the end of the rotating body, and the movable V-notch points at the extremities of extension arms of the freely rotating body such that the V-notch points can engage the V-grooves or holes in the work piece and/or the pallet so as to provide for the precise and secure 180-degree flipping;
the industrial pallet includes:
  an outer housing;
  an adjustable clamp member within the outer housing so as to be within the open bay of the industrial pallet, which can hold the work piece in the open bay of the industrial pallet;
  an inner pivotable housing that is separable from yet connectable with the outer housing;
  a z-axis pitch adjusting unit such that pitch of the inner housing can be adjusted by the z-axis pitch adjusting unit; and at least one of the following features (A", B"):
  (A") an outer lift bay area structure in the outer housing; and
  (B") a clamping knob/net pad to control necessary height in operation
the at least one station includes:
  a set up station, which is employed to set up the work piece in the industrial pallet, and which includes: receiver net pads; and
    a left-right centering unit, which includes a block insertable into a frame, wherein the block has an upstanding positioning pin to go into the positioning hole in the work piece; and
  at least one of a grinding station, an EDM station and a milling and/or milled work piece and/or tool storage station, at least one of which is employed in making the part.

20. A manufacturing system apparatus, which comprises an overhead gantry and/or flipping unit including a superstructure and at least one station under the superstructure, wherein the unit can be employed to move front station to station when there are a plurality of stations and/or flip a work piece by itself or the work piece mounted on or in an industrial pallet, and wherein at least one of the following features (A, B) is present:
  (A) robotic moving and/or loading is provided with the overhead gantry, making it an overhead gantry robot, which has two axes of motion only, an x-axis and a z-axis, and which includes connected components of a gantry robot truck and a gantry robot lift unit, wherein the movement/storage system superstructure includes:
    vertical support posts;
    an upper rail set provided as an opposing parallel pair, along which the overhead gantry robot can move horizontally;
    an outside gantry distance controlling chain/cable accommodating rail;
    a stationary upper rail rack gear;
    a lower rail set provided as an opposing parallel pair, which can provide storage areas and fortify the superstructure; and
    lower rail cross-members, which can provide storage and fortify the superstructure as well;
    the gantry robot truck provides for computer controlled, precision horizontal motion along the x-axis, and includes:
      a roller guide;
      a horizontal travel flexible cable/chain carrier, which can rest upon the outside gantry distance controlling chain/cable accommodating rail; and
      a horizontal pinion gear, which is powered, can rotate in a precise manner, and engages the stationary upper rail rack gear;
    the gantry robot lift unit provides for computer controlled, precision vertical motion along the z-axis, and includes:
      an outer guide rail;
      a z-axis lift member, which is guided by the outer guide rail and the roller guide, and which can be raised and lowered through a ball screw that is powered; and
      a lift hook assembly connected to a lower extremity of the z-axis lift member, which is provided as a set of two opposing, mirror image pairs, each of which includes a lift hook finger; and
  (B) the flipping unit includes a rotating body, which is powered; and stationary V-notch points are at an end of the rotating body, and movable V-notch points are at extremities of extension arms of a freely rotating body such that the V-notch points can engage V-grooves or holes in the work piece and/or the pallet so as to provide for precise and secure 180-degree flipping.

21. The manufacturing system apparatus of claim 20, wherein the feature "A" is present.

22. The manufacturing system apparatus of claim 20, wherein the feature "B" is present.

23. The manufacturing system apparatus of claim 20, wherein both of the features "A" and "B" are present.

24. The manufacturing system apparatus of claim 20, wherein the feature "B" is present, and robotic moving and/or loading is provided with the overhead gantry, making it an overhead gantry robot, which has two axes of motion only, an x-axis and a z-axis, and which includes connected components of a gantry robot truck and a gantry robot lift unit.

\* \* \* \* \*